US011943670B2

(12) United States Patent
Kim et al.

(10) Patent No.: US 11,943,670 B2
(45) Date of Patent: Mar. 26, 2024

(54) METHOD AND APPARATUS FOR PERFORMING HANDOVER IN WIRELESS COMMUNICATION SYSTEM

(71) Applicant: Samsung Electronics Co., Ltd., Gyeonggi-do (KR)

(72) Inventors: Donggun Kim, Gyeonggi-do (KR); Soenghun Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 17/038,200

(22) Filed: Sep. 30, 2020

(65) Prior Publication Data
US 2021/0105674 A1    Apr. 8, 2021

(30) Foreign Application Priority Data

Oct. 2, 2019   (KR) .......................... 10-2019-0122653
Nov. 1, 2019   (KR) .......................... 10-2019-0138774

(51) Int. Cl.
H04W 36/00    (2009.01)
H04L 69/04    (2022.01)
H04W 76/27    (2018.01)

(52) U.S. Cl.
CPC ......... *H04W 36/0069* (2018.08); *H04L 69/04* (2013.01); *H04W 74/0833* (2013.01); *H04W 76/27* (2018.02)

(58) Field of Classification Search
None
See application file for complete search history.

(56) References Cited

U.S. PATENT DOCUMENTS

| | | | |
|---|---|---|---|
| 10,015,070 B1 | 7/2018 | Cal et al. | |
| 2005/0025182 A1* | 2/2005 | Nazari | H04L 67/04 370/469 |
| 2005/0068963 A1* | 3/2005 | Lee | H04W 72/30 370/395.3 |
| 2007/0047452 A1* | 3/2007 | Lohr | H04B 7/2612 370/242 |
| 2007/0097937 A1* | 5/2007 | Kubota | H04L 1/1877 370/351 |
| 2009/0017826 A1 | 1/2009 | Shaheen | |

(Continued)

FOREIGN PATENT DOCUMENTS

CN           101785215        7/2010
WO    WO 2016/090124         6/2016

OTHER PUBLICATIONS

3GPP 36.321 v16.1.0 (Jul. 2020) "MAC Protocol Specification" Release 16, Dated Jul. 2020, (Year: 2020).*

(Continued)

*Primary Examiner* — Jamaal Henson
(74) *Attorney, Agent, or Firm* — The Farrell Law Firm, P.C.

(57) ABSTRACT

The present disclosure relates to a method and apparatus for performing handover in a wireless communication system. According to a method for performing a handover according to an embodiment of the present disclosure, a user equipment (UE) perform data transmission/reception with a source base station for each bearer, perform uplink data transmission by switching to a protocol of a second bearer from a protocol layer entity of a first bearer in case that a preset first condition is satisfied; and in case that a preset second condition is satisfied, stop downlink data reception from the source base station through the protocol layer entity of the first bearer, and perform data transmission/reception with a target base station.

6 Claims, 12 Drawing Sheets

(56) References Cited

U.S. PATENT DOCUMENTS

| | | | |
|---|---|---|---|
| 2009/0257399 A1 | 10/2009 | Kuo | |
| 2009/0316633 A1 | 12/2009 | Kato et al. | |
| 2010/0142485 A1 | 6/2010 | Lee et al. | |
| 2012/0140743 A1* | 6/2012 | Pelletier | H04W 76/28 370/335 |
| 2012/0147869 A1* | 6/2012 | Chhatriwala | H04W 28/065 370/338 |
| 2015/0215826 A1 | 7/2015 | Yamada | |
| 2018/0049091 A1 | 2/2018 | Wang | |
| 2018/0098250 A1* | 4/2018 | Vrzic | H04W 36/18 |
| 2018/0227819 A1* | 8/2018 | Lee | H04W 36/0016 |
| 2018/0367288 A1* | 12/2018 | Vrzic | H04W 36/22 |
| 2019/0149421 A1 | 5/2019 | Jin et al. | |
| 2019/0253945 A1* | 8/2019 | Paladugu | H04W 76/27 |
| 2020/0022035 A1* | 1/2020 | Kadiri | H04W 36/0072 |
| 2020/0022039 A1* | 1/2020 | Kadiri | H04W 36/08 |
| 2020/0029260 A1* | 1/2020 | Kadiri | H04W 36/08 |
| 2020/0163005 A1* | 5/2020 | Rao | H04W 4/46 |
| 2020/0314710 A1* | 10/2020 | Paladugu | H04W 76/30 |
| 2020/0314714 A1* | 10/2020 | Jung | H04W 76/30 |
| 2020/0314716 A1* | 10/2020 | Kim | H04W 36/0079 |
| 2020/0367101 A1* | 11/2020 | Paladugu | H04W 36/0055 |
| 2021/0051539 A1* | 2/2021 | Zhang | H04W 36/38 |
| 2021/0076269 A1* | 3/2021 | Awoniyi-Oteri | H04B 7/022 |
| 2021/0092597 A1* | 3/2021 | Sharma | H04W 12/0433 |

OTHER PUBLICATIONS

3GPP "5G; NR; Medium Access Control (MAC) Protocol Specification", TS 38.321 Version 15.3.0 Release 15, Dated Sep. 2018 (Year : 2018).*

Nokia, Nokia Shanghai Bell, "Analysis of DAPS Operation", R2-1909036, 3GPP TSG-RAN WG2 Meeting #107, Aug. 26-30, 2019, 7 pages.

ZTE Corporation, Sanechips, "Discussion on PDCP Aspects for RUDI", R2-1910758, 3GPP TSG RAN WG2 Meeting #107, Aug. 26-30, 2019, 6 pages.

Mediatek Inc., et al., "UL Handling with DAPS during RUDI Handover", R2-1909178, 3GPP TSG-RAN WG2 #107, Aug. 26-30, 2019, 8 pages.

Catt, "PDCP Aspects of DAPS-LTE", R2-1908920, 3GPP TSG-RAN WG2 Meeting #107, Aug. 26-30, 2019, 4 pages.

International Search Report dated Dec. 30, 2020 issued in counterpart application No. PCT/KR2020/013238, 10 pages.

European Search Report dated Jul. 12, 2022 issued in counterpart application No. 20873224.8-1216, 15 pages.

Nokia, Nokia Shanghai Bell, "On PUSCH Switch in Dual Active Protocol Stack", R2-1909033, 3GPP TSG-RAN WG2 Meeting #107, Aug. 26-30, 2019, 4 pages.

Chinese Office Action dated Feb. 8, 2024 Issued in counterpart application No. 202080069817.8, 12 pages.

* cited by examiner

METHOD AND APPARATUS FOR PERFORMING HANDOVER IN WIRELESS COMMUNICATION SYSTEM

TECHNICAL FIELD

The disclosure relates to a technology of performing handover in a wireless communication system, and more particularly, to a method and apparatus for efficiently performing handover without interruption to data transmission and reception during the handover.

BACKGROUND ART

In order to meet the increasing demand with respect to wireless data traffic after the commercialization of 4G communication systems, efforts have been made to develop improved 5G communication systems or pre-5G communication systems. For this reason, 5G communication systems or pre-5G communication systems are called Beyond 4G network communication systems or Post LTE systems. In order to achieve a high data transmission rate, consideration is given to implementing 5G communication systems in millimeter wave (mmW) frequency bands (e.g., 60 GHz bands). In order to reduce propagation path loss of radio waves and increase a propagation distance of radio waves in the millimeter wave frequency bands, in 5G communication systems, discussions are underway about technologies such as beam-forming, massive multiple input multiple output (MIMO), full dimensional MIMO (FD-MIMO), array antenna, analog beam-forming, and large-scale antennas. Also, in order to improve networks of systems, in 5G communication systems, developments of technologies such as evolved small cell, advanced small cell, cloud radio access network (cloud RAN), ultra-dense network, device to device communication (D2D), wireless backhaul, moving network, cooperative communication, coordinated multi-points (CoMP), and interference cancellation are underway. Furthermore, for 5G communication systems, developments of an advanced coding modulation (ACM) scheme such as hybrid frequency-shift keying (FSK) and quadrature amplitude modulation (QAM) modulation (FQAM) and sliding window superposition coding (SWSC) and an enhanced network access scheme such as filter bank multi carrier (FBMC), non-orthogonal multiple access (NOMA), and sparse code multiple access (SCMA) are underway.

The Internet is being developed from a human-centered network via which people generate and consume information to an Internet of Things (IoT) network via which distributed components, such as things, transmit or receive information to or from each other and process the information. Internet of Everything (IoE) technology in which big data processing technology is combined with IoT technology via connection with a cloud server or the like, is emerging. To implement IoT, technical elements, such as sensing technology, a wired/wireless communication and network infrastructure, service interface technology, and security technology, are required, and thus a sensor network, machine to machine (M2M) communication, machine type communication (MTC), and the like for connection between things have recently been studied. In IoT environments, an intelligent Internet Technology (IT) service for collecting and analyzing data generated by connected things and creating a new value in people's lives may be provided. IoT is applicable to various fields, such as smart home, smart building, smart city, smart car or connected car, smart grid, health care, smart home appliances, and advanced medical care, via fusion and combination of existing information technology (IT) with various industries.

Accordingly, various attempts are being made to apply 5G communication systems to IoT networks. For example, technology such as a sensor network, M2M communication, or MTC is implemented by 5G communication technology such as beam-forming, MIMO, or array antenna. The application of a cloud RAN as big data processing technology may also be considered as an example of convergence of 5G technology and IoT technology.

A method of providing a plurality of connections has been proposed as one of many techniques for satisfying a gradually-increasing demand for high-capacity communication. For example, in carrier aggregation (CA) of a Long Term Revolution (LTE) system, a plurality of connections can be provided through a plurality of carrier waves. Accordingly, a user may be provided services through more resources than before. In addition, various services including a broadcasting service such as Multimedia Broadcast Multicast Services (MBMS) may be provided through the LTE system.

DISCLOSURE

Technical Problem

Provided is an efficient handover method for supporting low transmission latency and a service without data interruption in a wireless communication system.

Technical Solution

The present disclosure relates to a method and apparatus for performing handover in a wireless communication system. According to a method for performing a handover according to an embodiment of the present disclosure, a user equipment (UE) perform data transmission/reception with a source base station for each bearer, perform uplink data transmission by switching to a protocol of a second bearer from a protocol layer entity of a first bearer in case that a preset first condition is satisfied; and in case that a preset second condition is satisfied, stop downlink data reception from the source base station through the protocol layer entity of the first bearer, and perform data transmission/reception with a target base station.

Advantageous Effects

The present disclosure proposes various efficient handover methods for preventing a data interruption time from occurring when a handover is performed in a wireless communication system to support a service without data interruption.

DETAILED DESCRIPTION

Figure 1A:
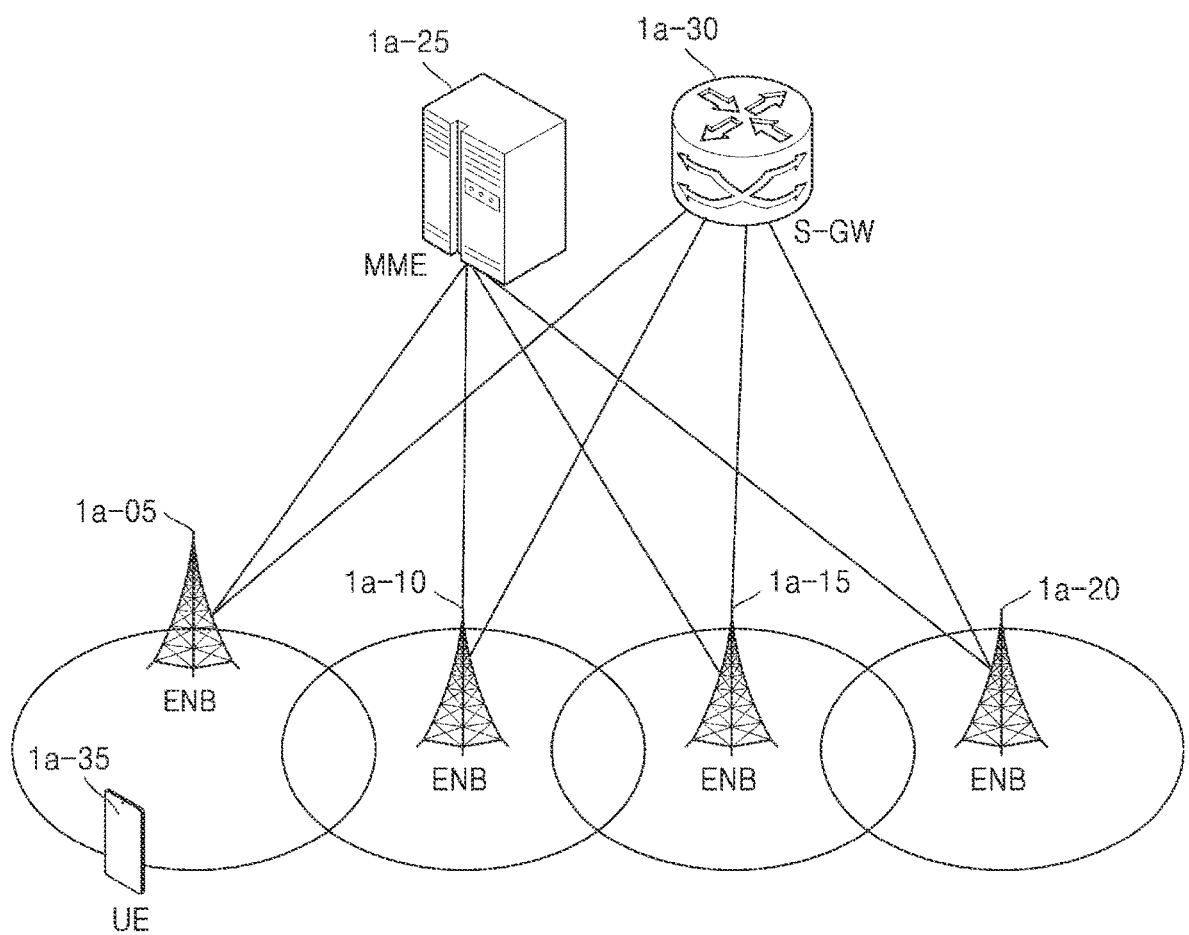
FIG. 1A is a diagram of a structure of a Long Term Evolution (LTE) system to which the disclosure is applicable.

In the aforementioned situation, the UE may perform data transmission or reception (UL or DL data transmission and reception) to or from the source BS via the protocol layers of the plurality of first bearers and simultaneously perform a random access procedure on the target BS via a protocol layer (e.g., the MAC layer) of the plurality of second bearers. The random access procedure may include transmission of a preamble, reception of a random access response, transmission of a message 3, reception of a message 4 (e.g., reception of a contention resolution MAC control element (CE) or a UL transmit resource), or the like.

In the aforementioned situation, the UE may perform data transmission or reception to or from the source BS via the protocol layers of the plurality of first bearers and simultaneously complete the random access procedure on the target BS via the protocol layer (e.g., the MAC layer) of the plurality of second bearers and transmit a handover complete message to the target BS via the protocol layers of the plurality of second bearers.

In the aforementioned situation, the UE may perform data transmission or reception to or from the source BS via the protocol layers of the plurality of first bearers and simultaneously complete the random access procedure on the target BS via the protocol layer (e.g., the MAC layer) of the plurality of second bearers, transmit the handover complete message to the target BS via the protocol layers of the plurality of second bearers, and perform data transmission and reception (UL or DL).

In the aforementioned situation, when the UE successfully completes the random access procedure with respect to the target BS and then initially receives a UL transmit resource from the target BS, the UE may discontinue data transmission to the source BS via the protocol layers of the plurality of first bearers, switch UL transmission, and then transmit data to the target BS via the plurality of second bearers.

In the aforementioned situation, when the UE receives a handover command message, the UE may continuously perform data transmission or reception (UL or DL data transmission and reception) to or from the source BS via the protocol layers of the plurality of first bearers, and perform a random access procedure on the target BS via the protocol layers of the plurality of second bearers, and, when the UE successfully completes the random access procedure and then initially receives a UL transmit resource from the target BS, the UE may discontinue data transmission to the source BS via the protocol layers of the plurality of first bearers, and perform UL data transmission to the target BS only via the protocol layers of the plurality of second bearers. Also, the UE may continuously receive DL data from the source BS via the protocol layers of the plurality of first bearers, and also continuously receive DL data from the target BS via the protocol layers of the plurality of second bearers.

In the aforementioned situation, a first bearer and a second bearer may constitute a second PDCP layer architecture, and, in the second PDCP layer architecture, the first bearer (e.g., a RLC layer, a MAC layer, or a PHY layer) for the source BS and the second bearer (e.g., a RLC layer, a MAC layer, or a PHY layer) for the target BS may be all connected to one PDCP layer, and UL data may perform transmission via one bearer from among the first bearer or the second bearer of the PDCP layer. That is, before the UE performs a random access procedure on the target BS, successfully completes the random access procedure, and initially receives a UL transmit resource from the target BS, the UE may transmit UL data via the first bearer, and, when the UE performs a random access procedure on the target BS, successfully completes the random access procedure, and initially receives a UL transmit resource from the target BS, the UE may discontinue data transmission via the first bearer, may switch the data transmission, and thus may transmit UL data to the target BS via the second bearer. However, the UE in the second PDCP layer architecture may receive DL data from the source BS or the target BS via the first bearer or the second bearer.

Hereinafter, in the disclosure, provided are efficient handover procedures without a data interruption time, based on the aforementioned features.

FIG. 1A is a diagram of a structure of an LTE system according to an embodiment of the disclosure.

Referring to FIG. 1A, a radio access network (RAN) of the LTE system includes evolved node Bs (hereinafter, referred to as ENBs, node Bs or base stations) 1a-05, 1a-10, 1a-15, and 1a-20, a mobility management entity (MME) 1a-25, and a serving-gateway (S-GW) 1a-30. A user equipment (UE) 1a-35 (also referred to as a terminal) accesses an external network via the ENB 1a-05, 1a-10, 1a-15, or 1a-20 and the S-GW 1a-30.

In FIG. 1A, the ENB 1a-05, 1a-10, 1a-15, or 1a-20 corresponds to an existing node B of a universal mobile telecommunication system (UMTS). The ENB 1a-05, 1a-10, 1a-15, or 1a-20 is connected to the UE 1a-35 through a radio channel and performs complex functions compared to the existing node B. In the LTE system, because all user traffic including a real-time service such as voice over internet protocol (VoIP) is provided via a shared channel, an entity that schedules UEs 1a-35 by gathering state information such as buffer states, available transmit power states, and channel states of the UEs 1a-35 may be necessary, and the ENB 1a-05, 1a-10, 1a-15, or 1a-20 may operate as the entity. A single ENB 1a-05, 1a-10, 1a-15, or 1a-20 generally controls multiple cells. For example, the LTE system uses radio access technology such as Orthogonal Frequency Division Multiplexing (OFDM) at a bandwidth of 20 MHz to achieve a data rate of 100 Mbps. Also, the LTE system uses an Adaptive Modulation & Coding (AMC) scheme to determine a modulation scheme and a channel coding rate in accordance with a channel state of the UE 1a-35. The S-GW 1a-30 is an entity for providing data bearers and generates or removes the data bearers under the control of the MME 1a-25. The MME 1a-25 is an entity for performing a mobility management function and various control functions for the UE 1a-35 and is connected to the ENBs 1a-05, 1a-10, 1a-15, and 1a-20.

Figure 1B:
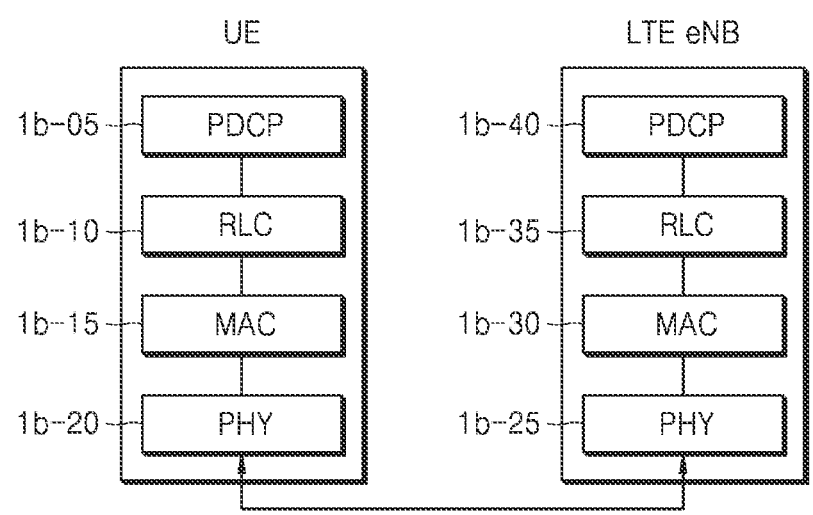
FIG. 1B is a diagram of a radio protocol architecture in an LTE system to which the disclosure is applicable.

FIG. 1B is a diagram of a radio protocol architecture in an LTE system, according to an embodiment of the disclosure.

Referring to FIG. 1B, the radio protocol architecture of the LTE system includes packet data convergence protocol (PDCP) layers 1b-05 and 1b-40, radio link control (RLC) layers 1b-10 and 1b-35, and media access control (MAC) layers 1b-15 and 1b-30 respectively for a UE and an eNB. The PDCP layer 1b-05 or 1b-40 is in charge of IP header compression/decompression, etc. Main functions of the PDCP layer 1b-05 or 1b-40 are summarized as below.

Header compression and decompression: ROHC only
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink The RLC layer 1b-10 or 1b-35 performs an automatic repeat request (ARQ) operation by reconfiguring PDCP Packet Data Units (PDUs) to appropriate sizes. Main functions of the RLC layer 1b-10 or 1b-35 are summarized as below.

Transfer of upper layer PDUs
Error Correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC layer 1b-15 or 1b-30 is connected to multiple RLC layers configured for a single UE and multiplexes RLC PDUs into a MAC PDU and demultiplexes the RLC PDUs from the MAC PDU. Main functions of the MAC layer 1b-15 or 1b-30 are summarized as below.

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding A physical (PHY) layer 1b-20 or 1b-25 channel-codes and modulates upper layer data into OFDM symbols and transmits the OFDM symbols through a radio channel, or demodulates OFDM symbols received through a radio channel and channel-decodes and delivers the OFDM symbols to an upper layer.

Figure 1C:
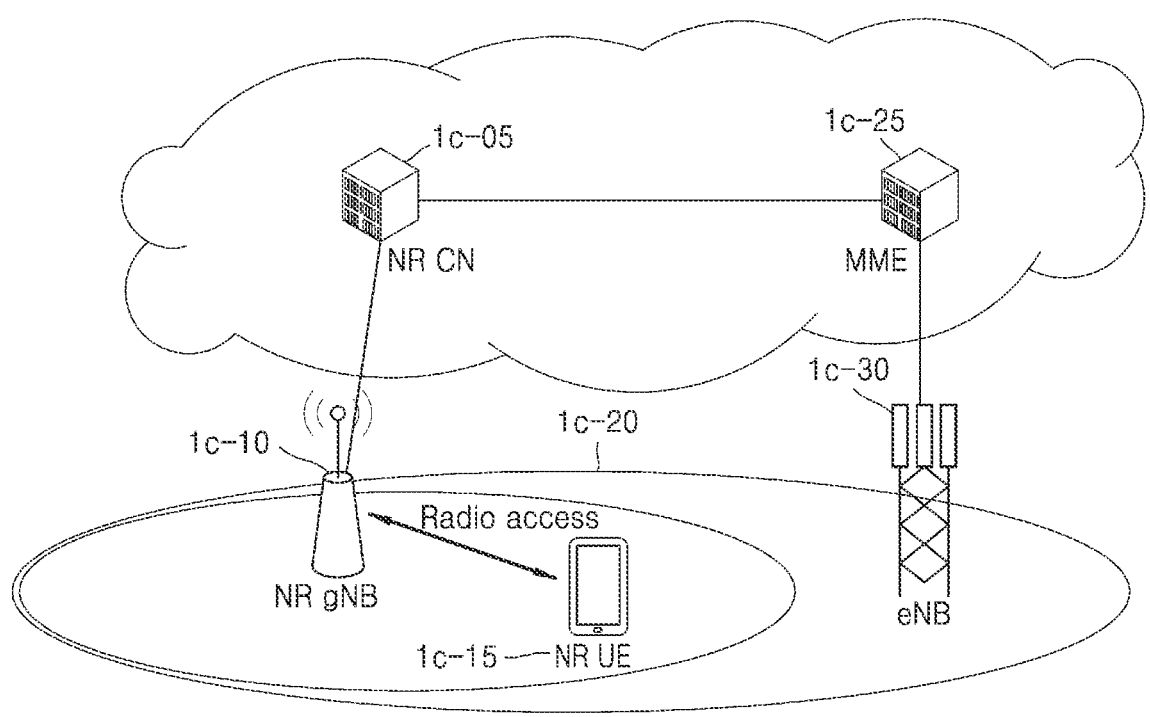
FIG. 1C is a diagram of a structure of a next-generation mobile communication system to which the disclosure is applicable.

FIG. 1C is a diagram of a structure of a next-generation wireless communication system, according to an embodiment of the disclosure.

Referring to FIG. 1C, a RAN of the next-generation wireless communication system (e.g., a new radio (NR) or 5G system) includes a new radio node B (hereinafter, referred to as a NR gNB or an NR base station) 1c-10 and a new radio core network (NR CN) 1c-05. A new radio user equipment (NR UE) or UE 1c-15 accesses an external network via the NR gNB 1c-10 and the NR CN 1c-05.

In FIG. 1C, the NR gNB 1c-10 corresponds to an eNB of an existing LTE system. The NR gNB 1c-10 may be connected to the NR UE 1c-15 through radio channels and may provide superior services compared to an existing node B. In the next-generation wireless communication system, because all user traffic is provided via a shared channel, an entity that schedules UEs (e.g., NR UE 1c-10) by gathering state information such as buffer states, available transmit power states, and channel states of the UEs (e.g., NR UE 1c-10) is necessary, and the NR gNB 1c-10 operates as the entity. A single NR gNB 1c-10 generally controls multiple cells. The NR or 5G communication system may have a bandwidth greater than an existing maximum bandwidth to achieve an ultrahigh data rate, compared to a current LTE system, and may use OFDM as radio access technology and may additionally use beamforming technology. Also, the NR or 5G communication system uses an Adaptive Modulation & Coding (AMC) scheme to determine a modulation scheme and a channel coding rate in accordance with a channel state of the NR UE 1c-15. The NR CN 1c-05 performs functions such as mobility support, bearer configuration, and quality of service (QoS) configuration. The NR CN 1c-05 is an entity for performing a mobility management function and various control functions for the NR UE 1c-15, and is connected to multiple base stations. The next-generation wireless communication system may cooperate with the existing LTE system, and the NR CN 1c-05 is connected to an MME 1c-25 through a network interface. The MME 1c-25 is connected to an eNB 1c-30 as an existing base station.

Figure 1D:
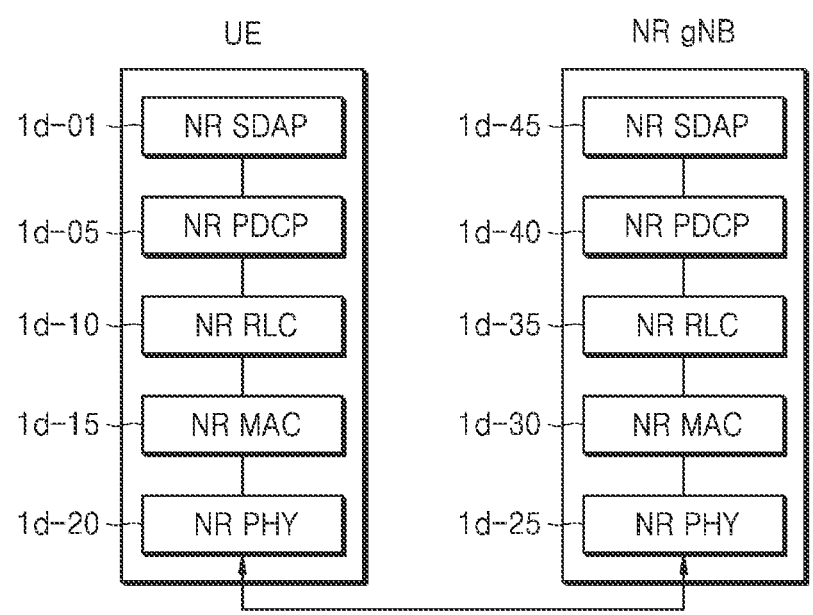
FIG. 1D is a diagram of a radio protocol architecture of a next-generation mobile communication system to which the disclosure is applicable.

FIG. 1D is a diagram of a radio protocol architecture of a next-generation wireless communication system, according to an embodiment of the disclosure.

Referring to FIG. 1D, the radio protocol architecture of the next-generation wireless communication system includes NR service data adaptation protocol (SDAP) layers 1d-01 and 1d-45, NR PDCP layers 1d-05 and 1d-40, NR RLC layers 1d-10 and 1d-35, and NR MAC layers 1d-15 and 1d-30 respectively for a UE and an NR gNB.

Main functions of the NR SDAP layer 1d-01 or 1d-45 may include at least some of the following functions.

Transfer of user plane data
Mapping between a QoS flow and a DRB for both DL and UL Marking QoS flow ID in both DL and UL packets
Reflective QoS flow to DRB mapping for the UL SDAP PDUs With regard to such an SDAP layer, the UE may be configured, via an RRC message, whether to use a header of the SDAP layer or use a function of the SDAP layer for each PDCP layer, each bearer, or each logical channel. In addition, with regard to such an SDAP layer, when an SDAP header is configured, a non-access stratum (NAS) reflective QoS 1-bit indicator and an access stratum (AS) reflective QoS 1-bit indicator of the SDAP header may indicate the UE to update or reconfigure mapping information regarding the data bearer and the QoS flow of UL and DL. The SDAP header may include QoS flow ID indicating QoS. The QoS information may be used as data processing priority information, scheduling information, etc. for supporting a smooth service.

Main functions of the NR PDCP layer 1d-05 or 1d-40 may include at least some of the following functions.
Header compression and decompression: ROHC only
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink The reordering function of the NR PDCP layer 1d-05 or 1d-40 refers to a function of sequentially reordering PDCP PDUs received from a lower layer, on a PDCP sequence number (SN) basis. The reordering function of the NR PDCP layer 1d-05 or 1d-40 may include a function of delivering the reordered data to an upper layer in order or immediately delivering the reordered data out of order, a function of recording missing PDCP PDUs by reordering the PDCP PDUs, a function of reporting a status of the missing PDCP PDUs to a transmitter, or a function of requesting to retransmit the missing PDCP PDUs.

Main functions of the NR RLC layer 1d-10 or 1d-35 may include at least some of the following functions.
Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment The in-sequence delivery of the NR RLC layer 1d-10 or 1d-35 refers to a function of sequentially delivering RLC SDUs received from a lower layer to an upper layer. When a single RLC SDU is segmented into multiple RLC SDUs and the multiple RLC SDUs are received, the in-sequence delivery of the NR RLC layer 1d-10 or 1d-35 may include a function of reassembling the multiple RLC SDUs and delivering the RLC SDUs, may include a function of reordering received RLC PDUs on an RLC SN or PDCP SN basis, may include a function of recording missing RLC PDUs by reordering the RLC PDUs, a function of reporting a status of the missing RLC PDUs to a transmitter, may include a function of requesting to retransmit the missing RLC PDUs, may include a function of delivering only RLC SDUs previous to a missing RLC SDU, to the upper layer in order, when the missing RLC SDU exists, may include a function of delivering all RLC SDUs received before a timer is started, to the upper layer in order, when a certain timer is expired although a missing RLC SDU exists, or may include a function of delivering all RLC SDUs received up to a current time, to the upper layer in order, when a certain timer is expired although a missing RLC SDU exists. The NR RLC layer 1d-10 or 1d-35 may process the RLC PDUs in order of reception regardless of the order of sequence numbers and deliver the RLC PDUs to the NR PDCP layer 1d-05 or 1d-40 out-of sequence delivery, and, when the NR RLC layer 1d-10 or 1d-35 receives segments, the NR RLC layer 1d-10 or 1d-35 may receive the segments received later or stored in a buffer, reconfigure the received segments into a whole RLC PDU, and then process and deliver the whole RLC PDU to the NR PDCP layer 1d-05 or 1d-40. The NR RLC layer 1d-10 or 1d-35 may not have a concatenation function, and the concatenation function may be performed by the NR MAC layer 1d-15 or 1d-30 or be replaced with a multiplexing function of the NR MAC layer 1d-15 or 1d-30.

The out-of-sequence delivery of the NR RLC layer 1d-10 or 1d-35 refers to a function of directly delivering RLC SDUs received from a lower layer, to an upper layer out of order. The out-of-sequence delivery of the NR RLC layer 1d-10 or 1d-35 may include a function of, when a single RLC SDU is segmented into multiple RLC SDUs and the multiple RLC SDUs are received, reassembling and delivering the multiple RLC SDUs, or may include a function of storing RLC SNs or PDCP SNs of received RLC PDUs and recording missing RLC PDUs by ordering the RLC PDUs.

The NR MAC layer 1d-15 or 1d-30 may be connected to multiple NR RLC layers configured for a single UE, and main functions of the NR MAC layer 1d-15 or 1d-30 may include at least some of the following functions.
Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding An NR PHY layer 1d-20 or 1d-25 may channel-code and modulate upper layer data into OFDM symbols and transmit the OFDM symbols through a radio channel, or demodulate OFDM symbols received through a radio channel and channel-decode and deliver the OFDM symbols to an upper layer.

Figure 1E:
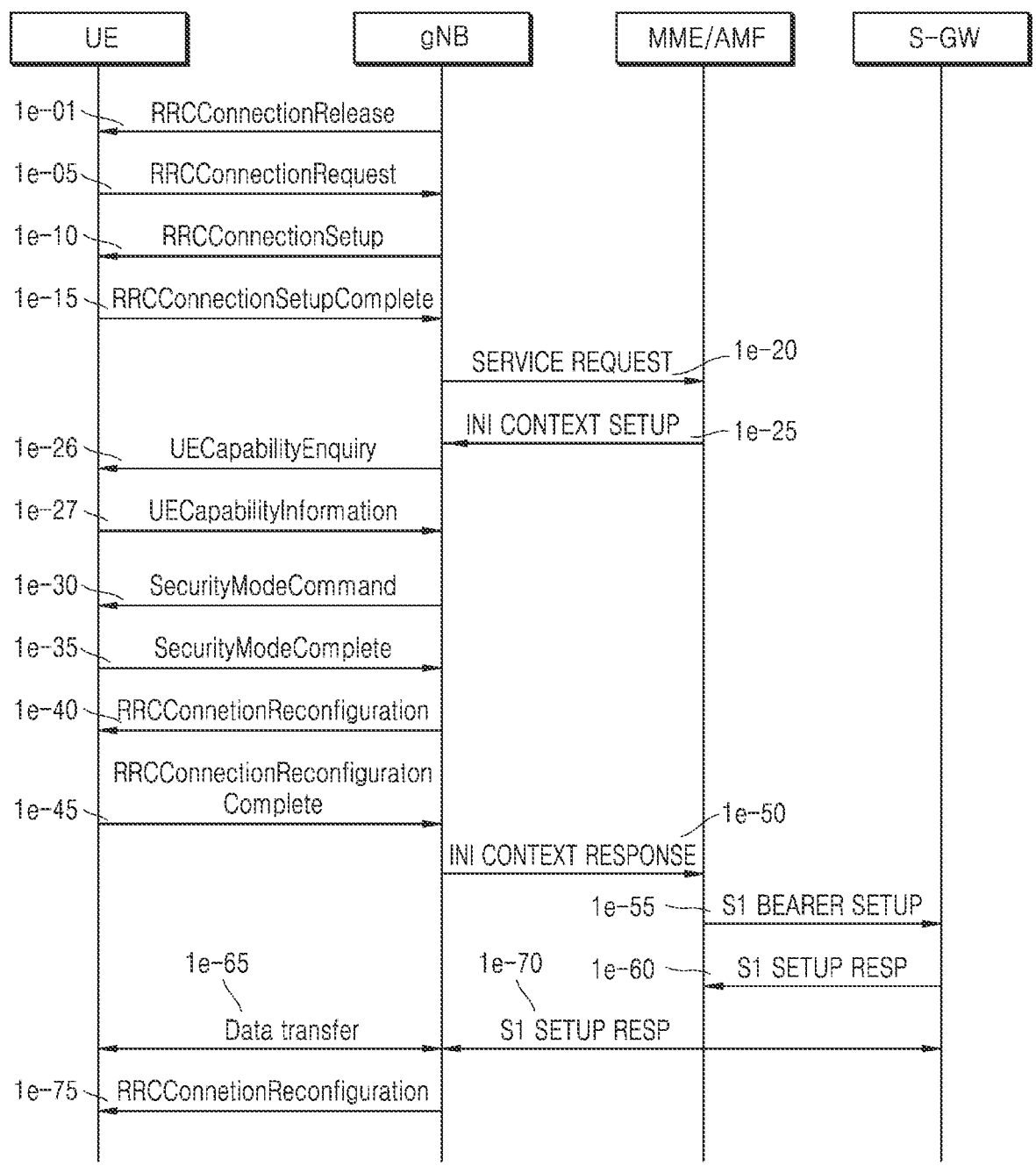
FIG. 1E is a diagram illustrating a procedure in which a user equipment (UE) switches from a Radio Resource Control (RRC) idle mode to an RRC connected mode and configures a connection with a network, according to an embodiment of the disclosure.

FIG. 1E is a diagram illustrating a procedure in which a UE switches from an RRC idle mode to an RRC connected mode and configures a connection with a network, according to an embodiment of the disclosure.

In FIG. 1E, when the UE configured to transmit or receive data in the RRC connected mode does not transmit or receive data for a certain reason or for a certain time, a gNB may transmit an RRCConnectionRelease message to the UE such that the UE switches to the RRC idle mode (operation 1e-01). Afterward, when the UE that is not currently configured for connection (hereinafter, also referred to as an idle-mode UE) has data to be transmitted, the UE may perform an RRC connection establishment procedure on the gNB. The UE establishes an inverse direction transmission synchronization with the gNB via a random access process and transmits an RRCSetupRequest message to the gNB (operation 1e-05). The RRCSetupRequest message may include, for example, an identifier of the UE and an establishment cause for establishing a connection (e.g., establishmentCause). The gNB transmits an RRCConnectionSetup message to the UE so that the UE configures an RCC connection (operation 1e-10).

The RRCConnectionSetup message includes configuration information for each service/bearer/RLC layer or each logical channel or each bearer, and may include information about whether to use ROHC for each bearer/logical channel, ROHC configuration information (e.g., a ROHC version, initial information, etc.), statusReportRequired information (information with which the gNB indicates a PDCP Status report to the UE), and drb-ContinueROHC information (configuration information indicating to continue and changelessly use ROHC configuration information, which may be transmitted by being included in PDCP layer configuration information (pdcp-config)). The RRCConnectionSetup message may also include RRC connection configuration information. A bearer for RRC connection is called a signaling radio bearer (SRB) and is used in transmission and reception of an RRC message that is a control message between the UE and the gNB.

The UE that has configured RRC connection transmits an RRCConnectionSetupComplete message to the gNB (operation 1e-15). The RRCConnectionSetupComplete message may include a control message such as a SERVICE REQUEST message indicating that the UE requests an access mobility management function (AMF) or a mobility management entity (MME) for bearer configuration for a certain service. The gNB transmits the SERVICE REQUEST message included in the RRCConnectionSetupComplete message to the AMF or the MME (operation 1e-20), and the AMF or the MME determines whether to provide the service requested by the UE. When it is determined that the service requested by the UE is to be provided, the MME or the AMF transmits an INITIAL CONTEXT SETUP REQUEST message to the gNB (operation 1e-25). The INITIAL CONTEXT SETUP REQUEST message includes, for example, QoS information that is to be applied during DRB configuration, and security-related information (e.g., a Security Key and a Security Algorithm) that is to be applied to the DRB.

When the gNB does not receive UE capability information from the MME or the AMF, the gNB may transmit a UE capability information request message to the UE so as to check the UE capability information (operation 1e-26). When the UE receives the UE capability information request message, the UE may configure, generate, and report a UE capability information message to the gNB (operation 1e-27). The UE capability information message may include information about which types of handover methods are supported by the UE. For example, the UE may report a UE capability to the gNB via an indicator indicating whether or not the UE supports an efficient handover method (i.e., a Dual Active Protocol Stack (DAPS) handover method) proposed in the disclosure. When the gNB checks the UE capability information and then indicates handover to the UE, the gNB may define an indicator indicating handover in a handover command message, according to each of the handover methods, and may indicate the handover to the UE. For example, the gNB may indicate the efficient handover method (the DAPS handover method) proposed in the disclosure to the UE, or may configure the DAPS handover method for each bearer (a DRB or a SRB) of the UE. When the gNB configures the DAPS handover method to the UE, the gNB also indicates other handover methods (e.g., a conditional handover method (method in which, when configurations of a plurality of target cells and a plurality of conditions are configured to the UE and the UE satisfies the conditions in a cell selection procedure or a cell reselection procedure, the UE performs a handover procedure on one target cell) or a handover method without a random access procedure), thereby preventing data loss or a transmission delay which may occur in handover. The UE may perform a handover procedure on a target gNB according to the handover method indicated in the handover command message.

To configure security with the UE, the gNB exchanges a SecurityModeCommand message (operation 1e-30) and a SecurityModeComplete message (operation 1e-35). When security configuration is complete, the gNB transmits an RRCConnectionReconfiguration message to the UE (operation 1e-40).

The RRCConnectionReconfiguration message includes configuration information for each service/bearer/RLC layer or each logical channel or each bearer, and may include information about whether to use ROHC for each bearer/logical channel, ROHC configuration information (e.g., a ROHC version, initial information, etc.), statusReportRequired information (information with which the gNB indicates a PDCP Status report to the UE), and drb-ContinueROHC information (configuration information indicating to continue and changelessly use ROHC configuration information, which may be transmitted by being included in PDCP layer configuration information (pdcp-config)). The RRCConnectionReconfiguration message may also include RRC connection configuration information. A bearer for RRC connection is called a signaling radio bearer (SRB) and is used in transmission and reception of an RRC message that is a control message between the UE and the gNB.

The RRCConnectionReconfiguration message may include configuration information of a DRB in which user data is to be processed, and the UE configures a DRB by applying the configuration information and transmits an RRCConnectionReconfigurationComplete message to the gNB (operation 1e-45).

When configuration of the DRB with the UE is complete, the gNB transmits an INITIAL CONTEXT SETUP COMPLETE message to the MME or the AMF (operation 1e-50).

In response to the INITIAL CONTEXT SETUP COMPLETE message, the MME or the AMF exchanges an S1 BEARER SETUP message and an S1 BEARER SETUP RESPONSE message with an S-GW to configure an S1 bearer (operations 1e-55 and 1e-60). The S1 bearer is a connection for data transmission, which is configured between the S-GW and the gNB, and corresponds to the DRB in a one-to-one manner.

When all of these processes are completed, the UE transmits or receives data to or from the gNB via the S-GW (operations 1e-65 and 1e-70). As such, a general data transmission process roughly include three operations of RRC connection configuration, security configuration, and DRB configuration. The gNB may transmit an RRCConnectionReconfiguration message to the UE in order to renew, add, or change configuration for a certain reason (operation 1e-75).

In the disclosure, a bearer may include an SRB and a DRB, wherein the SRB means a signaling radio bearer and the DRB means a data radio bearer. The SRB is mainly used to transmit and receive an RRC message of an RRC layer, and the DRB is mainly used to transmit and receive a plurality of items of user layer data (or user plane data). An unacknowledged mode (UM) DRB means a DRB that uses an RLC layer operating in a UM, and an acknowledged mode (AM) DRB means a DRB that uses an RLC layer operating in an AM.

Figure 1F:
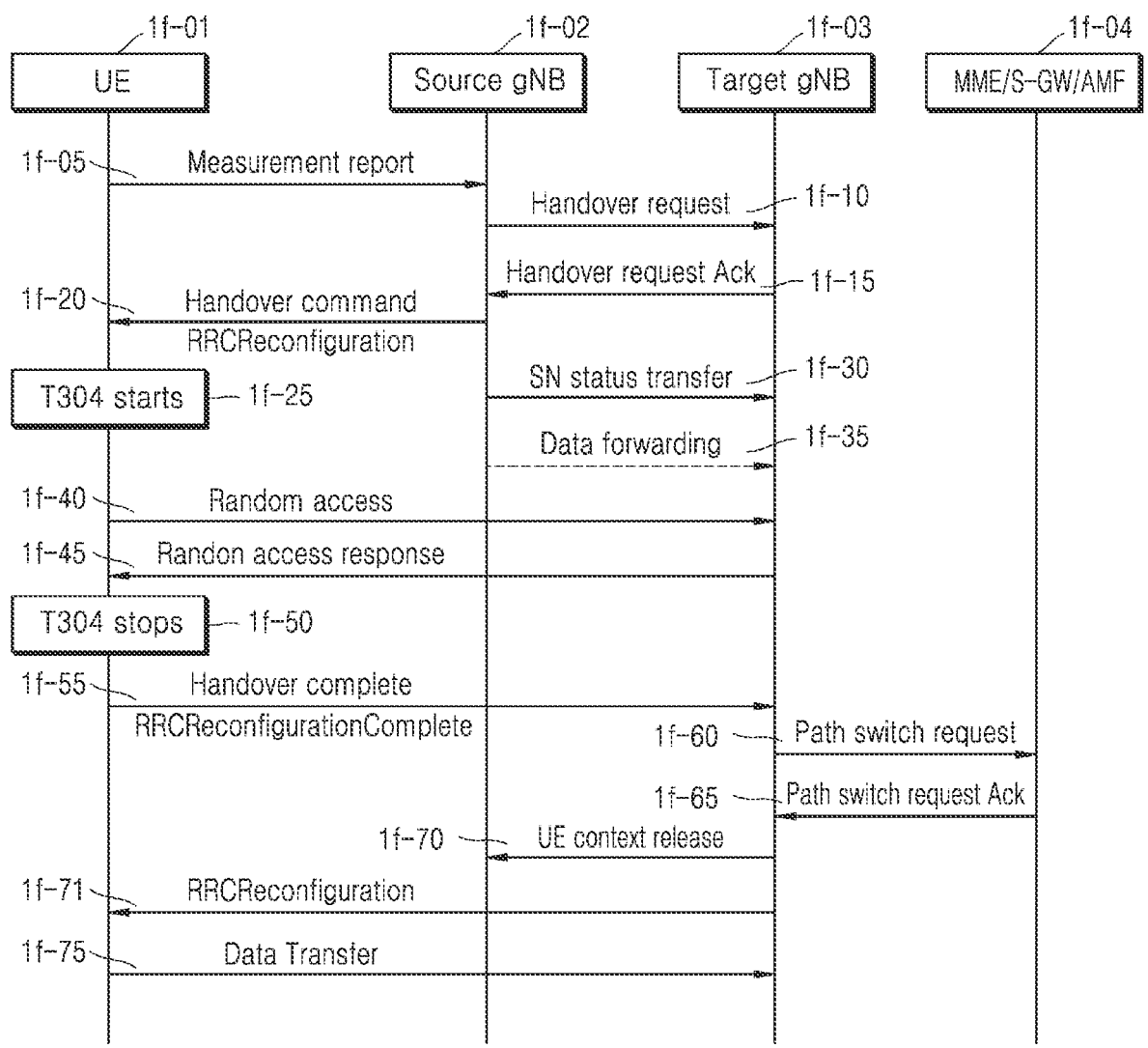
FIG. 1F is a diagram illustrating signaling procedures for performing handover in a next-generation wireless communication system, according to an embodiment of the disclosure.

FIG. 1F is a diagram illustrating signaling procedures for performing handover in a next-generation wireless communication system, according to an embodiment of the disclosure.

A UE 1f-01 in an RRC connected mode state reports a cell measurement report to a current source gNB 1f-02 in a periodic manner or when a particular event is satisfied (operation 1f-05). The source gNB 1f-02 determines, based on the cell measurement report, whether the UE 1f-01 is to perform handover to an adjacent cell. The handover refers to a technology of switching a source BS to another BS (or another cell in a same BS), the source BS providing a service to a UE in a connected mode state. When the source gNB 1f-02 determines handover, the source gNB 1f-02 requests the handover by transmitting a handover request message (e.g., a handover preparation information message) to a new BS to provide a service to the UE 1f-01, that is, to a target gNB 1f-03 (operation 1f-10). When the target gNB 1f-03 accepts the handover request, the target gNB 1f-03 transmits a handover request acknowledgement (Ack) message (e.g., a handover command message) to the source gNB 1f-02 (operation 1f-15). In response to the handover request Ack message, the source gNB 1f-02 transmits, to the UE 1f-01, the handover command message (an RRCReconfiguration message included in a Dedicated Control Channel (DCCH) of the handover request Ack message) (operation 1f-20). The source gNB 1f-02 extracts the handover command message from the handover request Ack message received from the target gNB 1f-03 and transmits the handover command message to the UE 1f-01 by using an RRC Connection Reconfiguration message (operation if-20).

In the disclosure, provided is a method of determining an efficient DAPS handover method by using the handover preparation information message (operation 1f-10) and the handover command message (operation 1f-15) when the source gNB 1f-02 transmits the handover preparation information message (operation If-10) and, in response thereto, the target gNB 1f-03 transmits the handover command message (operation 1f-15) to the source gNB 1f-02.

Embodiment 1 of determining an efficient DAPS handover method, which is provided in the disclosure, will now be described.

In Embodiment 1 of the disclosure, an entity for determining a DAPS handover method may be a source BS. Also, in Embodiment 1 of the disclosure, in a case where the source BS requests a target BS for the DAPS handover method, the target BS may always indicate or perform the DAPS handover method.

The source BS may indicate, to the target BS and by defining a new indicator in the handover preparation information message, that the source BS is to perform the DAPS handover method proposed in the disclosure, and may request the DAPS handover method. The handover preparation information message may include current bearer configuration information of a UE, security key information, cell group configuration information, UE capability information, or the like. The source BS is configured to pre-share a capability of the target BS and thus may know in advance whether the target BS supports the DAPS handover method. The source BS may indicate, to the target BS, that the source BS is to perform the DAPS handover method, may indicate, to the target BS, that the source BS may perform data forwarding fast or early, and may indicate the target BS to prepare to receive data forwarding and fast process the data forwarding. The source BS may make a request for the DAPS handover method for each bearer (a DRB or an SRB).

In a case where the target BS receives the handover preparation information message and identifies that an indicator requesting the DAPS handover method is included therein, when the target BS configures an RRCReconfiguration message to indicate handover to the UE, the target BS may add, to the RRCReconfiguration message, an indicator requesting the DAPS handover method, bearer configuration information required for the UE to perform the DAPS handover method, bearer configuration information, security key information, cell group configuration information, or system information. Also, the target BS may add the RRCReconfiguration message to a DL-DCCH message of a handover command message and may transmit the handover command message to the source BS. The target BS may perform indication of the DAPS handover method for each bearer (a DRB or an SRB).

When the source BS receives the handover command message, the source BS may extract the RRCReconfiguration message included in the handover command message or may transmit the RRCReconfiguration message to the UE, and thus may indicate handover. The source BS may identify the indicated DAPS handover method for each bearer, and may perform the DAPS handover method for each bearer (a DRB or a SRB).

Embodiment 2 of determining an efficient DAPS handover method, which is provided in the disclosure, will now be described.

In Embodiment 2 of the disclosure, an entity for determining a DAPS handover method may be a target BS. Also, in Embodiment 2 of the disclosure, in a case where a source BS requests the target BS for the DAPS handover method through an indicator, the target BS may reject or accept the request or may indicate another handover method to the source BS via a handover command message indicating the other handover method.

The source BS may indicate, to the target BS and by defining a new indicator in the handover preparation information message, that the source BS is to perform the DAPS handover method proposed in the disclosure, and may request the DAPS handover method. The handover preparation information message may include current bearer configuration information of a UE, security key information, cell group configuration information, UE capability information, or the like. The source BS is configured to pre-share a capability of the target BS and thus may know in advance whether the target BS supports the DAPS handover method. The source BS may indicate, to the target BS, that the source BS is to perform the DAPS handover method, may indicate, to the target BS, that the source BS may fast perform early data forwarding, and may indicate the target BS to prepare to receive data forwarding and fast process the data forwarding. The source BS may make a request for the DAPS handover method for each bearer (a DRB or an SRB).

In a case where the target BS receives the handover preparation information message and identifies that an indicator requesting the DAPS handover method is included therein, the target BS may reject or accept the request for the DAPS handover method or may indicate another handover method to the source BS, based on whether the target BS can support the DAPS handover method, an amount of current transmit resources, or scheduling. The target BS may add, to a handover command message, an indicator to reject the request for the DAPS handover method, an indicator to accept the request for the DAPS handover method, or an indicator to indicate the other handover method, and may transmit the handover command message. In a case where the target BS accepts the DAPS handover request when configuring an RRCReconfiguration message to indicate handover to the UE, the target BS may configure the RRCReconfiguration message by including the indicator indicating the DAPS handover method in the RRCReconfiguration message. In a case where the target BS rejects the DAPS handover request, the target BS may configure the RRCReconfiguration message by including an indicator indicating another handover method in the RRCReconfiguration message and including, in the RRCReconfiguration message, bearer configuration information necessary for the UE to perform the DAPS handover method or the other handover method, bearer configuration information, security key information, cell group configuration information, or system information. Also, the target BS may add the RRCReconfiguration message to a DL-DCCH message of a handover command message and may transmit the handover command message to the source BS. The target BS may perform indication of the DAPS handover method for each bearer (a DRB or an SRB).

When the source BS receives the handover command message, the source BS may check an indicator included in the handover command message and thus may identify whether the request for the DAPS handover method is accepted or rejected. When the request for the DAPS handover method is accepted, the source BS may also perform the DAPS handover method, may extract the RRCReconfiguration message included in the handover command message, may transmit the RRCReconfiguration message to the UE, and thus may indicate handover. When the source BS checks the indicator included in the handover command message, when the request for the DAPS handover method is rejected or the other handover message is indicated, the source BS may perform the other handover method indicated by the target BS. The source BS may extract the RRCReconfiguration message included in the handover command message or may transmit the RRCReconfiguration message to the UE, and thus may indicate handover. As another method, even when a separate indicator is not present in the handover command message, the source BS may check a type of a handover message indicated by the target BS by reading the RRCReconfiguration message included in the handover command message, and may identify whether the request for the DAPS handover method is accepted or rejected.

The source BS may also perform a handover method (e.g., the DAPS handover method or the other handover method) indicated in the RRCReconfiguration message.

The source BS may identify the indicated DAPS handover method for each bearer, and may perform the DAPS handover method for each bearer (a DRB or a SRB).

Embodiment 3 of determining an efficient DAPS handover method, which is provided in the disclosure, will now be described.

In Embodiment 3 of the disclosure, an entity for determining a DAPS handover method is a target BS. Also, in Embodiment 3 of the disclosure, the target BS may check the capability of a UE, and may determine a handover method (e.g., a DAPS handover method) according to whether the target BS can support the DAPS handover method, an amount of current transmit resources, or scheduling.

A source BS may add, to the handover preparation information message, current bearer configuration information of a UE, security key information, cell group configuration information, UE capability information, or the like, and may transmit the handover preparation information message to request the target BS for handover. The source BS is configured to pre-share a capability of the target BS and thus may know in advance whether the target BS supports the DAPS handover method. When the target BS indicates to perform the DAPS handover method, the source BS may perform data forwarding fast or early.

The target BS may receive the handover preparation information message, and may determine the handover method (e.g., the DAPS handover method) according to UE capability information, whether the target BS can support the DAPS handover method, an amount of current transmit resources, or scheduling. When the target BS determines the DAPS handover method for the handover command message, the target BS may add, to the handover command message, an indicator indicating the DAPS handover method, and may transmit the handover command message. In a case where the target BS determines the DAPS handover when configuring an RRCReconfiguration message to indicate handover to the UE, the target BS may configure the RRCReconfiguration message by including the indicator indicating the DAPS handover method in the RRCReconfiguration message. In a case where the target BS determines an another handover method different from the DAPS handover, the target BS may configure the RRCReconfiguration message by including an indicator indicating the other handover method in the RRCReconfiguration message and including, in the RRCReconfiguration message, bearer configuration information necessary for the UE to perform the DAPS handover method or the other handover method, bearer configuration information, security key information, cell group configuration information, or system information. Also, the target BS may add the RRCReconfiguration message to a DL-DCCH message of a handover command message and may transmit the handover command message to the source BS. The target BS may perform indication of the DAPS handover method for each bearer (a DRB or an SRB).

When the source BS receives the handover command message, the source BS may check an indicator included in the handover command message and thus may identify whether the DAPS handover method is determined. When the DAPS handover method is indicated, the source BS may perform the DAPS handover method, may extract the RRCReconfiguration message included in the handover command message, may transmit the RRCReconfiguration message to the UE, and thus may indicate handover. When the source BS checks the indicator included in the handover command message, when the DAPS handover method is not determined or the other handover message is indicated, the source BS may perform the other handover method indicated by the target BS. The source BS may extract the RRCReconfiguration message included in the handover command message or may transmit the RRCReconfiguration message to the UE, and thus may indicate handover.

As another method, even when a separate indicator is not present in the handover command message, the source BS may check a type of a handover message indicated by the target BS by reading the RRCReconfiguration message included in the handover command message, and may identify whether the DAPS handover method is determined. When the other handover method is indicated, the source BS may perform the indicated other handover method. The source BS may identify the indicated DAPS handover method for each bearer, and may perform the DAPS handover method for each bearer (a DRB or a SRB).

A new embodiment may be derived by combining methods of Embodiment 1, Embodiment 2, or Embodiment 3 of determining an efficient DAPS handover method proposed in the disclosure.

A BS may indicate, via the RRCReconfiguration message, an efficient handover method (DAPS handover method) proposed in the disclosure to the UE, or in another method, the BS may configure the DAPS handover method for each bearer (a DRB or an SRB) of the UE. When the BS configures the DAPS handover method to the UE, the BS also indicates other handover methods (e.g., a conditional handover method (method in which, when configurations of a plurality of target cells and a plurality of conditions are configured to the UE and the UE satisfies the conditions in a cell selection procedure or a cell reselection procedure, the UE performs a handover procedure on one target cell) or a handover method without a random access procedure), thereby preventing data loss or a transmission delay which may occur in handover. In response to the RRCReconfiguration message, the UE 1*f*-01 discontinues data transmission and reception to and from the source gNB 1*f*-02 and starts T304 timer. When the UE 1*f*-01 cannot succeed in handover to the target gNB 1*f*-03 for a preset time, the UE 1*f*-01 returns to original configuration of the UE 1*f*-01, and the UE 1*f*-01 is transited to an RRC idle state. The source gNB 1*f*-02 provides a sequence number (SN) status of UL/DL data, and, when DL data is present, the source gNB 1*f*-02 transmits the DL data or the UL data to the target gNB 1*f*-03 (operations if-30 and if-35). The UE 1*f*-01 attempts a random access to a target cell (e.g., target gNB 1*f*-03) indicated by the source gNB 1*f*-02 (operation if-40). The UE 1*f*-01 performs the random access to notify switching of the UE 1*f*-01 to the target cell and simultaneously to match UL synchronization, via the handover. For the random access, the UE 1*f*-01 transmits, to the target cell, a preamble that corresponds to a preamble ID provided by the source gNB 1*f*-02 or corresponds to a randomly-selected preamble. After a certain number of subframes after the preamble is transmitted, the UE 1*f*-01 monitors whether a Random Access Response (RAR) message is transmitted from the target cell. A time interval for monitoring the RAR message is called a RAR window. When the RAR message is received during the RAR window (operation if-45), the UE 1*f*-01 transmits a handover complete message in an RRC Reconfiguration Complete message to the target gNB 1*f*-03 (operation 1*f*-55). When the UE 1*f*-01 successfully receives the RAR message from the target gNB 1*f*-03, the UE 1*f*-01 ends T304 timer (operation if-50). To switch a path of bearers which is configured for the source gNB 1*f*-02, the target gNB 1*f*-03 requests a core network 1*f*-04 (e.g., MME/S-GW/AMF) for a path switch of the bearers (operations if-60 and if-65), and indicates the source gNB 1*f*-02 to discard UE context of the UE 1*f*-01 (operation if-70). The target gNB if-03 may transmit an RRC message (e.g., an RRCReconfiguration message if-71) to the UE 1*f*-01 and may indicate, by using an indicator, the UE 1*f*-01 to release connection with the source gNB 1*f*-02. As another method, the target gNB 1*f*-03 may transmit MAC control information, RLC control information, or PDCP control information to the UE 1*f*-01 and thus may indicate the UE 1*f*-01 to release connection with the source gNB 1*f*-02. Accordingly, the UE 1*f*-01 attempts, at a start point of the RAR window, to receive data from the target gNB 1*f*-03, and after the RAR message is received, the UE 1*f*-01 transmits an RRC Reconfiguration Complete message and receives a DL transmit resource or a UL transmit resource, thereby starting data transmission and reception to and from the target gNB 1*f*-03.

In the disclosure, provided are non-interruption handover methods capable of minimizing a data interruption time due to handover or making the data interruption time become 0 ms in the next-generation wireless communication system.

A UE may configure a plurality of first bearers with a source BS and may perform data transmission and reception (UL or DL data transmission and reception) via protocol layers (a PHY layer, a MAC layer, a RLC layer, a PDCP layer or the like) of each of the plurality of first bearers. However, in the disclosure, for convenience of description, it is assumed, in drawings and descriptions, that the UE has one bearer.

Figure 1G:
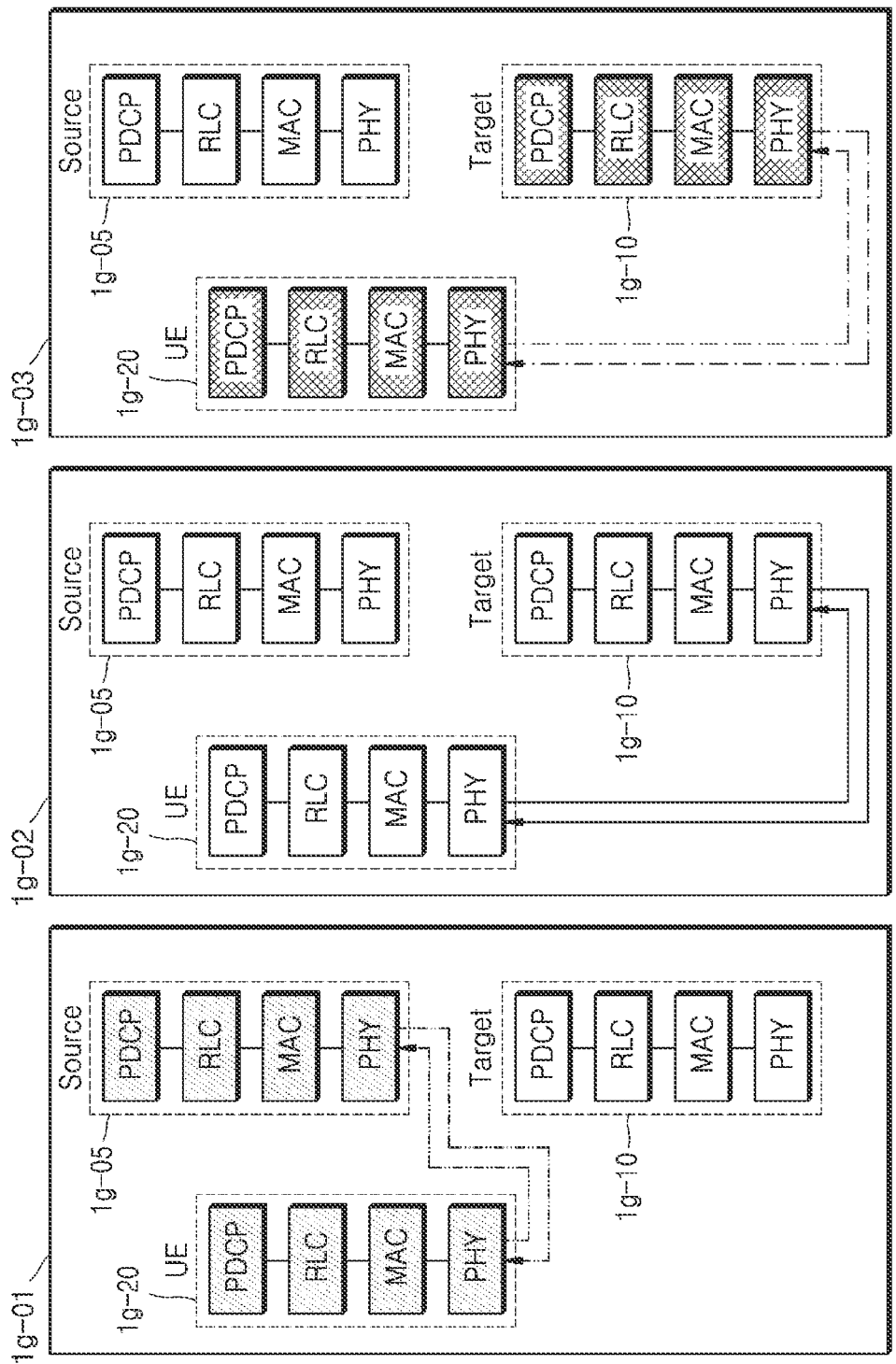
FIG. 1G illustrates particular operations of Embodiment 1 of the efficient handover method for minimizing a data interruption time due to handover, according to an embodiment of the disclosure.

FIG. 1G illustrates particular operations of Embodiment 1 of the efficient handover method for minimizing a data interruption time due to handover, according to an embodiment of the disclosure.

In Embodiment 1 of the efficient handover method of FIG. 1G, a UE 1*g*-20 may transmit or receive data to or from a source BS 1*g*-05 in first operation 1*g*-01 and then receive a handover command message from the source BS 1*g*-05. When receiving the handover command message according to a handover method indicated by the handover command message (e.g., an RRCReconfiguration message), the UE 1*g*-20 may release connection with the source BS 1*g*-05, may perform a random access procedure on a target BS 1*g*-10, and may perform a handover procedure.

According to an embodiment, to minimize a data interruption time occurring during handover based on the indicated handover method, the UE 1*g*-20 may continuously transmit and receive data to and from the source BS 1*g*-05.

According to Embodiment 1 of the efficient handover method of FIG. 1G, in second operation 1*g*-02, when the UE 1*g*-20 performs the random access procedure on the target BS 1*g*-10 by using the handover method indicated by the handover command message received from the source BS 1*g*-05, transmits a preamble to the target BS 1*g*-10, or initially transmits data in a UL transmit resource by using a PUCCH or PUSCH transmit resource, the UE 1*g*-20 may discontinue data transmission and reception (UL data transmission and DL data reception) to and from the source BS 1*g*-05.

According to Embodiment 1 of the efficient handover method of FIG. 1G, in third operation 1*g*-03, the UE 1*g*-20 may complete the random access procedure with respect to the target BS 1*g*-10, may transmit a handover complete message to the target BS 1*g*-10, and may start data transmission and reception (UL data transmission and DL data reception) to and from the target BS 1*g*-10.

Figure 1H:
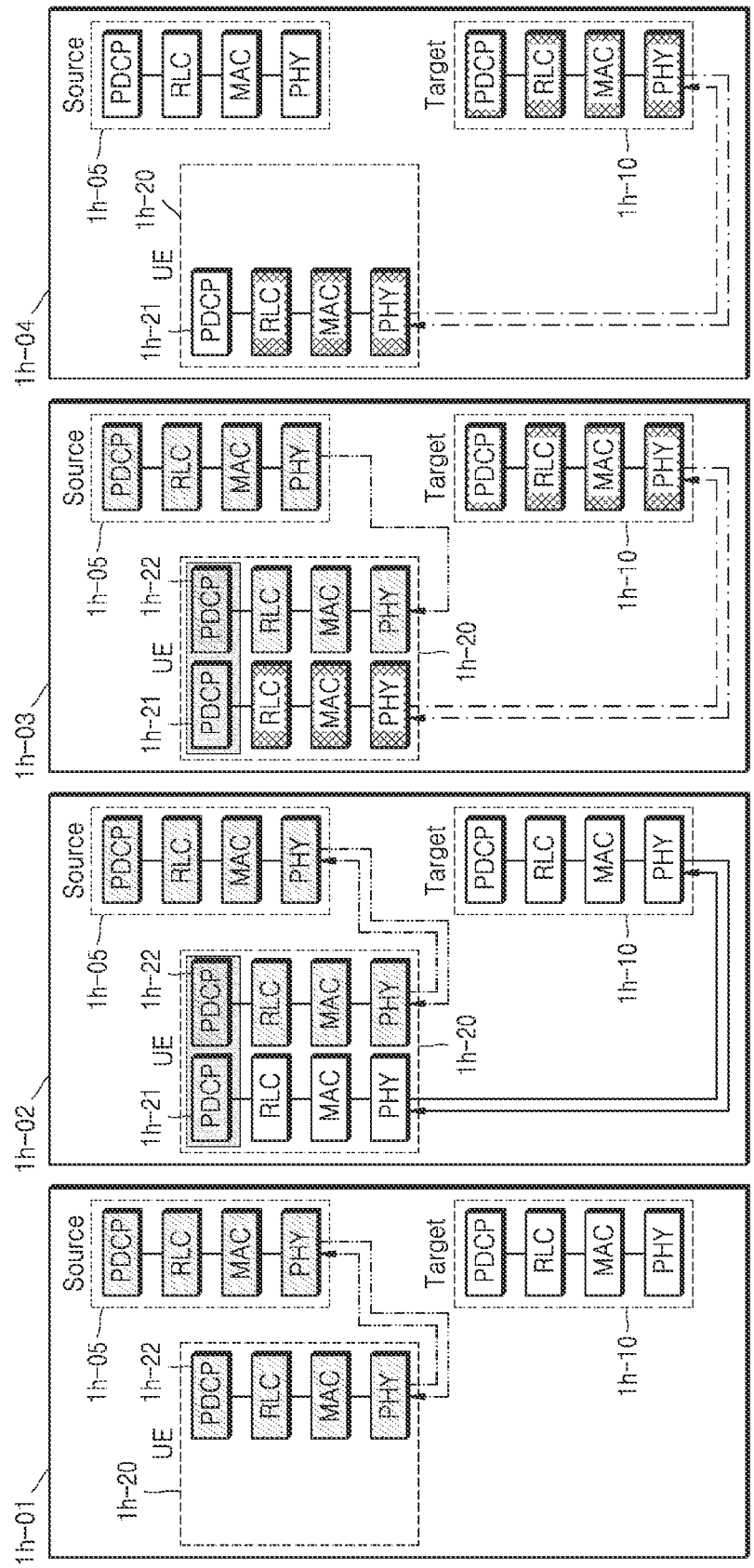
FIG. 1H illustrates particular operations of Embodiment 2 of the efficient handover method for minimizing a data interruption time due to handover, according to an embodiment of the disclosure.

FIG. 1H illustrates particular operations of Embodiment 2 of the efficient handover method for minimizing a data interruption time due to handover, according to an embodiment of the disclosure.

In Embodiment 2 of the efficient handover method of FIG. 1H, a UE 1*h*-20 may transmit or receive data to or from a source BS 1*h*-05 in first operation 1*h*-01 and then receive a handover command message from the source BS 1*h*-05. When the source BS 1*h*-05 indicates, in the handover command message, the efficient handover method according to Embodiment 2 of the disclosure (e.g., a DAPS handover method) or indicates the efficient handover method for each bearer, even when the UE 1*h*-20 has received the handover command message, the UE 1*h*-20 may continuously transmit and receive data to and from the source BS 1*h*-05 via protocol layers 1*h*-22 of a first bearer so as to minimize a data interruption time occurring during handover.

When the RRC layer of the UE 1*h*-20 identifies, in the handover command message, an indication with respect to the efficient handover method according to Embodiment 2 of the disclosure (e.g., the DAPS handover method) or identifies an identifier with respect to the DAPS handover method for each bearer, the RRC layer may provide the indicator to a PDCP layer corresponding to each bearer or a bearer for which the DAPS handover method is indicated. In response to the indicator, the PDCP layer may switch a first PDCP layer architecture 1*i*-11 or 1*i*-12 (see FIG. 1I) to a second PDCP layer architecture 1*i*-20 (see FIG. 1I). First operation 1*h*-01 of FIG. 1H may be described as an operation in which the UE 1*h*-20 receives a handover command message (RRCReconfiguration message) from a BS. When the PDCP layer transits to the second PDCP layer architecture 1*i*-20 according to configuration included in the received handover command message, protocol layers (a PHY layer, a MAC layer, a RLC layer or a PDCP layer) 1*h*-21 of a second bearer for a target BS 1*h*-10 may be pre-configured or pre-established, a security key for the target BS 1*h*-10 may be derived and updated, and header (or data) compression context for the target BS 1*h*-10 may be configured. The UE 1*h*-20 may receive the handover command message from the source BS 1*h*-05. When the handover command message indicates the DAPS handover method proposed in the disclosure, when the handover command message indicates a DAPS handover method for particular bearers, or when a PDCP realignment timer value is newly configured, the UE 1*h*-20 may switch a PDCP layer from the first PDCP layer architecture or function 1*i*-11 or 1*i*-12 to the second PDCP layer architecture or function 1*i*-20 proposed in the disclosure with respect to each bearer or a bearer for which the DAPS handover method is indicated. In this case, the UE 1*h*-20 may update a variable for realignment to a PDCP SN or COUNT value which is predicted to be received next time, may stop a realignment timer, and may restart the realignment timer.

The handover command message may be configured and established such that a second bearer has the same identifier as a first bearer so that a data interruption time does not occur in each bearer. In Embodiment 2 of the disclosure, a PDCP layer of a first bearer and a PDCP layer of a second bearer may logically operate as one PDCP layer, and detailed descriptions about the operation will now be provided with reference to FIG. 1I. In Embodiment 2 of the disclosure, when the UE 1*h*-20 is configured to transmit UL data to both the source BS 1*h*-05 and the target BS 1*h*-10, to avoid a coverage lessening problem due to insufficient transmission power of the UE 1*h*-20 or to prevent link selection by which, when the UE 1*h*-20 transmits UL data, the UE 1*h*-20 has to determine to which BS the UE 1*h*-20 has to request a transmit resource and to transmit the UL data, the transmission of the UL data in Embodiment 2 of the disclosure may be performed by only one of the source BS 1*h*-05 and the target BS 1*h*-10. Therefore, the UE 1*h*-20 may perform a scheduling request to only one of the source BS 1*h*-05 or the target BS 1*h*-10, may transmit a report (e.g., a buffer status report) about a size of a plurality of items of data to be transmitted by the PDCP layer to only one of the source BS 1*h*-05 or the target BS 1*h*-10, may receive a UL transmit resource, and thus may transmit UL data to only one BS. Also, even when the UE 1*h*-20 receives a handover command message from the source BS 1*h*-05, the UE 1*h*-20 may not initialize a MAC layer of a first bearer so as to prevent data loss by continuing data transmission and reception by retransmitting HARQ. Also, a RLC layer in an AM mode may continuously perform RLC retransmission.

In Embodiment 2 of the efficient handover method of FIG. 1H, in second operation 1*h*-02, even when performing the random access procedure on the target BS 1*h*-10 indicated by the handover command message via the protocol layers of the second bearer, the UE 1*h*-20 may continue data transmission or reception (UL data transmission or DL data reception) to or from the source BS 1*h*-05 via the protocol layers 1*h*-22 of the first bearer. Second operation 1*h*-02 may be described as an operation in which the UE 1*h*-20 performs a cell selection procedure or a cell reselection procedure, and performs a random access procedure on a target cell indicated by the handover command message (an RRCReconfiguration message) received from the source BS 1*h*-05.

In Embodiment 2 of the efficient handover method of FIG. 1H, when the first condition to be described below is satisfied in third operation 1*h*-03, the UE 1*h*-20 may discontinue UL data transmission to the source BS 1*h*-05 via the protocol layers 1*h*-22 of the first bearer and may transmit the UL data to the target BS 1*h*-10 via the protocol layers 1*h*-21 of the second bearer. In this regard, the UE 1*h*-20 may continuously receive DL data from the source BS 1*h*-05 and the target BS 1*h*-10 via the protocol layers 1*h*-22 of the first bearer and the protocol layers 1*h*-21 of the second bearers. Third operation 1*h*-03 may be an operation in which the UE 1*h*-20 satisfies the first condition and thus switches UL transmission from the source BS 1*h*-05 to the target BS 1*h*-10. In detail, the UE 1*h*-20 may transmit UL data to the source BS 1*h*-05 via the first bearer until the UE 1*h*-20 satisfies the first condition, and, when the UE 1*h*-20 satisfies the first condition, the UE 1*h*-20 may discontinue transmission of the UL data to the source BS 1*h*-05 via the first bearer, and start transmission of the UL data to the target BS 1*h*-10 via the second bearer. Also, as in the PDCP layer structure proposed with reference to FIG. 1I, a reception PDCP layer 1*h*-21 of the second bearer and a reception PDCP layer 1*h*-22 of the first bearer may operate as one entity, and the PDCP layer structure proposed with reference to FIG. 1I may continuously receive data from the source BS 1*h*-05 or the target BS 1*h*-10 without interruption by using stored transceived data, SN information, or information such as header compression and decompression context.

The first condition may be one of conditions below. The first conditions below propose a UL data transmission switching time point at which a transmit resource may be the most efficiently used, and a data interruption time may be minimized as much as possible.

It may be determined that the first condition is satisfied in a case where the UE successfully completes the random access procedure on the target BS via the layers (e.g., the MAC layer) of the second bearer and receives allocation of a first UL transmit resource from the target BS, or a case where a UL transmit resource is first indicated to the UE.

For example, in a case where the UE receives a handover command message from the source BS and receives an indication of a random access to the target BS, when the indicated random access is a Contention Free Random Access (CFRA) (e.g., when a predefined preamble or a UE-cell identifier (e.g., Cell-Radio Network Temporary Identifier (C-RNTI) is allocated), it may be determined that the random access procedure is successfully completed when the UE transmits the predefined preamble to a cell of the target BS and receives a RAR message. Therefore, when the UE receives a first UL transmit resource allocated, or included, or indicated in the RAR message, it may be determined that the first condition is satisfied. As another method, when the UE first receives a UL transmit resource after the UE receives the RAR message, it may be determined that the first condition is satisfied.

In a case where the UE receives a handover command message from the source BS and receives an indication of a random access to the target BS, when the indicated random access is a Contention-Based Random Access (CBRA) (e.g., when a predefined preamble or a UE-cell identifier (e.g., C-RNTI) is not allocated), it may be determined that the random access procedure on the target BS is successfully completed when the UE transmits a preamble (e.g., a random preamble) to a cell of the target BS and receives a RAR message, transmits a message3 (e.g., a handover complete message) to the target BS by using a UL transmit resource allocated, or included, or indicated in the RAR message, and receives, from the target BS and via a Contention resolution MAC CE indicating resolution of contention.

Therefore, when the UE monitors the PDCCH and first receives or is first indicated with the UL transmit resource via the PDCCH corresponding to the C-RNTI of the UE, it may be determined that the first condition is satisfied. As another method, when a size of the UL transmit resource allocated in the RAR message is sufficient and thus the UE can transmit the message3 and additionally transmit UL data, the UE may determine that the UE first receives a UL transmit resource and thus may determine that the first condition is satisfied. In other words, when the UE receives a RAR message, the UE may determine that the UE first receives the UL transmit resource and thus may determine that the first condition is satisfied.

When a handover method (RACH-less handover) that does not require a random access procedure is also indicated in the handover command message received by the UE, and
when the handover command message includes a UL transmit resource with respect to the target BS, the UE transmits a message3 (e.g., a handover complete message or a RRCReconfigurationComplete message) by using the UL transmit resource with respect to the target BS, and when the UE receives, from the target BS, a UE Identity Confirmation MAC CE, it may be determined that a random access procedure is successfully completed and the first condition is satisfied. As another method, when the random access procedure is successfully completed and then the UE performs PDCCH monitoring and receives a first UL transmit resource via the PDCCH corresponding to the C-RNTI of the UE, it may be determined that the first condition is satisfied.

When the handover command message does not include the UL transmit resources with respect to the target BS, the UE performs PDCCH monitoring on the target BS (or a cell) and when the UE receives a UL transmit resource via the PDCCH corresponding to the C-RNTI of the UE, or transmits a message3 (e.g., a handover complete message or a RRCReconfigurationComplete message) by using the UL transmit resource, and receives a UE Identity Confirmation MAC CE from the target BS, it may be determined that a random access procedure is successfully completed and the first condition is satisfied. As another method, when the random access procedure is successfully completed and then the UE performs PDCCH monitoring and receives a first UL transmit resource via the PDCCH corresponding to the C-RNTI of the UE, it may be determined that the first condition is satisfied.

Hereinafter, provided is a method of efficiently switching UL data from a source BS to a target BS, the method being performed when the DAPS handover method proposed in the disclosure is performed. A MAC layer of a second bearer for the target BS may check or identify whether the first condition corresponding to the second bearer is satisfied, by using one or a combination of the methods to be described below.

First method: For example, when an RRCReconfiguration message received by the UE indicates DAPS handover, the UE may configure the MAC layer for the target BS corresponding to the second bearer, and the MAC layer may perform a random access procedure and may identify whether the first condition is satisfied. When the first condition is satisfied, the MAC layer may indicate, by using an indicator, an upper layer (e.g., a PDCP layer) to switch UL data transmission from the source BS via a first bearer to the target BS via the second bearer in the DAPS handover method proposed in the disclosure.

Second method: As another method, for example, when an RRCReconfiguration message received by the UE indicates DAPS handover, the UE may configure the MAC layer for the target BS corresponding to the second bearer, and the MAC layer may perform a random access procedure and may identify whether the first condition is satisfied. When the first condition is satisfied, the MAC layer may indicate, to an upper layer (e.g., an RRC layer), that the first condition is satisfied. The upper layer (e.g., the RRC layer) may indicate, by using an indicator, a lower layer (e.g., a PDCP layer) to switch UL data transmission from the source BS via a first bearer to the target BS via the second bearer in the DAPS handover method proposed in the disclosure.

Third method: When an RRCReconfiguration message received by the UE indicates DAPS handover, the UE may configure the MAC layer for the target BS corresponding to the second bearer, and when the RRC layer of the UE indicates, by using an indicator, a lower layer (e.g., the MAC layer) to perform the DAPS handover, the MAC layer may perform a random access procedure and may check whether the first condition is satisfied. When the first condition is satisfied, the MAC layer may indicate, by using an indicator, an upper layer (e.g., a PDCP layer) to switch UL data transmission from the source BS via a first bearer to the target BS via the second bearer in the DAPS handover method proposed in the disclosure.

Fourth method: As another method, when an RRCReconfiguration message received by the UE indicates DAPS handover, the UE may configure the MAC layer for the target BS corresponding to the second bearer, and when the RRC layer of the UE indicates, by using an indicator, a lower layer (e.g., the MAC layer) to perform the DAPS handover, the MAC layer may perform a random access procedure and may check whether the first condition is satisfied. When the first condition is satisfied, the MAC layer may indicate, to an upper layer (e.g., an RRC layer), that the first condition is satisfied. The upper layer (e.g., the RRC layer) may indicate, by using an indicator, a lower layer (e.g., a PDCP layer) to switch UL data transmission from the source BS via a first bearer to the target BS via the second bearer in the DAPS handover method proposed in the disclosure.

When the PDCP layer receives an indicator indicating that the first condition is satisfied or an indicator indicating switching UL data transmission from the source BS to the target BS, from the upper layer (e.g., the RRC layer) or the lower layer (e.g., the MAC layer) according to the first method, the second method, the third method, or the fourth method (e.g., when the DAPS handover method is indicated), the PDCP layer may perform a protocol layer operation proposed below so as to efficiently perform switching of UL data transmission, and may perform one or more operations from among operations below so as to prevent data loss due to the UL data transmission. The operations below may be applied to the PDCP layer connected to an AM DRB or a UM DRB (a RLC layer operating in an AM mode or a RLC layer operating in a UM mode). Before the first condition is satisfied or before the indicator indicating that the first condition is satisfied is received, the PDCP layer may indicate, to the MAC layer of the first bearer for the source BS, that there is data to be transmitted by indicating a size or amount (e.g., a PDCP data volume) of the data to be transmitted when a buffer stores the data to be transmitted, and may perform UL data transmission to the source BS. Then, the MAC layer of the first bearer for the source BS may perform a scheduling request or a buffer status report procedure to receive allocation of a UL transmit resource from the source BS. However, when the first condition is satisfied or the indicator indicating that the first condition is satisfied is received, UL data transmission may be switched to the target BS in a manner described below.

To switch UL data transmission from the first bearer for the source BS to the second bearer for the target BS, the PDCP layer may indicate, to the MAC layer of the first bearer for the source BS, that a size or amount of data to be transmitted is 0 (or none). In other words, the PDCP layer may indicate, to the MAC layer of the first bearer, that a data volume (a PDCP data volume) of the PDCP layer is 0, thereby indicating that there is no more data to be transmitted (even when the buffer actually stores a plurality of items of data to be transmitted, in order to switch UL data transmission, the PDCP layer may indicate, to the MAC layer of the first bearer for the source BS, that there is no more data to be transmitted).

The PDCP layer connected to an AM DRB (RLC layer operating in an AM mode) (all pre-stored PDCP PDUs are discarded (e.g., PDCP SDUs are not discarded to prevent loss of original data)) may perform, based on header context for the target BS, a new header compression procedure on a plurality of items of data (PDCP SDUs of the buffer) in ascending order of COUNT values (or PDCP SNs) allocated before the first condition is satisfied or the indicator indicating that the first condition is satisfied is received, the ascending order starting from first data (e.g., a PDCP SDU) for which successful delivery is not acknowledged by lower layers (e.g., the RLC layer corresponding to the first bearer for the source BS). The PDCP layer may re-perform, by applying security keys for the target BS, an integrity procedure or a ciphering procedure on the plurality of items of data on which the new header compression procedure has been performed, may configure a PDCP header, and may provide the PDCP header to a lower layer (RLC layer of the second bearer for the target BS), thereby performing retransmission or transmission. In other words, the PDCP layer performs accumulated retransmission on data starting from first data for which successful delivery is not acknowledged. As another method, when the PDCP layer performs retransmission, the PDCP layer may perform retransmission only on a plurality of items of data for which successful delivery is not acknowledged by lower layers (e.g., the RLC layers of the first bearer for the source BS). In detail, the PDCP layer connected to the AM DRB (RLC layer operating in the AM mode) (PDCP PDUs that are stored to be transmitted to the source BS via a first protocol layer previously connected to the PDCP layer are all discarded (e.g., PDCP SDUs may not be discarded to prevent loss of original data)) may perform, by applying header compression (or data compression) protocol context or security key corresponding to the target BS, a new header or data compression procedure on only a plurality of items of data (e.g., the PDCP SDUs) for which successful delivery is not acknowledged by lower layers (e.g., the RLC layers) that are the first protocol layer for the source BS, based on COUNT values (or PDCP SNs) allocated before the first condition is satisfied or the indicator indicating that the first condition is satisfied is received. The PDCP layer may re-perform an integrity procedure or a ciphering procedure on the plurality of items of data on which the new header or data compression procedure has been performed, may configure a PDCP header, and may provide the PDCP header to a lower layer that is a second protocol layer for transmission to the target BS, thereby performing retransmission or transmission. In other words, to prevent waste of transmit resources, the PDCP layer may perform selective retransmission only on the plurality of items of data for which successful delivery is not acknowledged. As another method, the transmission or the retransmission may be performed after lower layers (e.g., a transmission or reception RLC layer or MAC layer) that are the first protocol layer for transmitting data to the source BS are released.

When the buffer stores data to be transmitted, the PDCP layer may indicate, to the MAC layer of the second bearer for the target BS, that there is the data to be transmitted by indicating a size or amount (e.g., a PDCP data volume) of the data to be transmitted, and may perform switching of UL data transmission to the target BS. Then, the MAC layer of the second bearer for the target BS may perform a scheduling request or a buffer status report procedure to receive allocation of a UL transmit resource from the target BS.

According to Embodiment 2 of the efficient handover method (e.g., the DAPS handover method) proposed in the disclosure, even after the UE receives a handover command message (e.g., an RRCReconfiguration message), the UE may continuously receive DL data from the source BS or the target BS via the protocol layers of the first bearer for the source BS or the second bearer for the target BS. Also, according to Embodiment 2 of the disclosure, to allow the UE to smoothly receive DL data from the source BS (or the target BS) or to allow the source BS (or the target BS) to smoothly transmit DL data to the UE, for AM bearers, the UE may be allowed to continuously perform UL transmission of a RLC status report, not data, on the source BS (or the target BS) via the protocol layers of the first bearer (or the second bearer). In other words, even when the first condition is satisfied and thus the UE switches UL data transmission to the target BS, when the UE has to transmit the RLC status report, HARQ ACK or NACK, or PDCP control data (a PDCP ROHC feedback or a PDCP status report) to the source BS, the UE may be allowed to perform data transmission via the first bearer for the source BS. This is because, in a case of the AM bearers, when data is transmitted to a transmitting terminal and then successful delivery is not indicated by using a RLC status report (i.e., when the RLC status report is not received), data cannot be continuously transmitted thereafter. In detail, even when the first condition is satisfied in third operation 1h-03 in Embodiment 2 of the efficient handover method of FIG. 1H, the UE 1*h*-20 discontinues UL data transmission to the source BS 1*h*-05 via the protocol layers 1*h*-22 of the first bearer, performs switching, and then starts UL data transmission to the target BS 1*h*-10 via the protocol layers 1*h*-21 of the second bearer, the UE 1*h*-20 may continuously transmit HARQ ACK or HARQ NACK information, a RLC status report (ACK or NACK information), or PDCP control data (e.g., a PDCP status report or PDCP ROHC feedback information) via the protocol layers of the first bearer (or the second bearer) so as to smoothly receive DL data from the source BS 1*h*-05 (or the target BS 1*h*-10) or to allow the source BS 1*h*-05 (or the target BS 1*h*-10) to smoothly transmit DL data. In detail, in third operation 1*h*-03 in Embodiment 2 of the efficient handover method of FIG. 1H, even when the first condition is satisfied and thus the UE 1*h*-20 discontinues UL data transmission to the source BS 1*h*-05 via the protocol layers 1*h*-22 of the first bearer, performs switching, and then starts UL data transmission to the target BS 1*h*-10 via the protocol layers 1*h*-21 of the second bearer, the UE 1*h*-20 may continuously perform data transmission due to HARQ retransmission by the MAC layer or data transmission due to retransmission by the RLC layer in the AM mode so as to prevent loss of data to the source BS 1*h*-05. In detail, in third operation 1*h*-03 in Embodiment 2 of the efficient handover method of FIG. 1H, when the first condition is satisfied and thus the UE 1*h*-20 discontinues UL data transmission to the source BS 1*h*-05 via the protocol layers 1*h*-22 of the first bearer, performs switching, and then starts UL data transmission to the target BS 1*h*-10 via the protocol layers 1*h*-21 of the second bearer, the source BS 1*h*-05 or the target BS 1*h*-10 may divide a time and may allocate a transmit resource to the UE 1*h*-20 so as to prevent collision between a UL transmit resource to the target BS 1*h*-10 and a UL transmit resource to the source BS 1*h*-05. When the UL transmit resource to the target BS 1*h*-10 collides with and thus overlaps with the UL transmit resource to the source BS 1*h*-05, the UE 1*h*-20 may perform data transmission to the source BS 1*h*-05 by giving priority to the UL transmit resource to the source BS 1*h*-05 so as to maintain transmission of DL data or continuously receive the DL data from the source BS 1*h*-05 without a problem. As another method, when the UL transmit resource to the target BS 1*h*-10 collides with and thus overlaps with the UL transmit resource to the source BS 1*h*-05, the UE 1*h*-20 may perform data transmission to the target BS 1*h*-10 by giving priority to the UL transmit resource to the target BS so as to maintain transmission of DL data from the target BS 1*h*-10.

In detail, when the UE receives a handover command message in which handover (the DAPS handover method) corresponding to Embodiment 2 of the disclosure is indicated or is indicated for each bearer, the UE 1*h*-20 or a bearer for which the DAPS handover is indicated may perform a scheduling request via a first protocol layer, may receive a UL transmit resource by transmitting a buffer status report to the source BS 1*h*-05, may transmit UL data, and may receive DL data from the source BS 1*h*-05 until the first condition is satisfied. However, when the first condition is satisfied, the UE 1*h*-20 does not transmit data to the source BS anymore, may perform a scheduling request via a second protocol layer by switching a UL, may receive a UL transmit resource by transmitting a buffer status report to the target BS 1*h*-10, and may transmit UL data to the target BS 1*h*-10. According to an embodiment of the disclosure, the UE 1*h*-20 may continuously receive DL data from the source BS 1*h*-05, and, even after UL transmission switching, the UE 1*h*-20 may continuously transmit HARQ ACK or HARQ NACK, a RLC status report, or PDCP control data (e.g., a PDCP status report or ROHC feedback information) which corresponds to the DL data. Also, the UE 1*h*-20 may continuously receive DL data from the source BS 1*h*-05 or the target BS 1*h*-10 even when the first condition is satisfied.

When a second condition is satisfied in fourth operation 1*h*-04 in Embodiment 2 of the efficient handover method of FIG. 1H, the UE 1*h*-20 may discontinue DL data reception from the source BS 1*h*-05 via the protocol layers 1*h*-22 of the first bearer or may release connection to the source BS 1*h*-05.

The second condition may be one of conditions below. Also, the PDCP layer 1*h*-21 of the second bearer may continuously perform data transmission or reception without interruption to or from the target BS by using data to be transmitted or data to be received, SN information, or header compression and decompression context, which is stored in the PDCP layer 1*h*-22 of the first bearer.

- When the UE 1*h*-20 performs a random access procedure on the target BS via layers 1*h*-21 of the second bearer and receives a RAR message, it may be determined that the second condition is satisfied.
- When the UE 1*h*-20 performs a random access procedure on the target BS via the layers 1*h*-21 of the second bearer, receives a RAR message, and configures and transmits a handover complete message to the target BS, it may be determined that the second condition is satisfied.
- When the UE 1*h*-20 performs a random access procedure on the target BS via the layers 1*h*-21 of the second bearer, and first transmits data by using a PUCCH or PUSCH UL transmit resource or first receives the PUCCH or PUSCH UL transmit resource, it may be determined that the second condition is satisfied.
- When a BS configures a separate timer to a UE by using an RRC message and the separate timer is expired, it may be determined that the second condition is satisfied.

The separate timer may start when the UE receives a handover command message from a source BS, the UE starts a random access to a target BS (transmits a preamble), the UE receives a RAR message from the target BS, the UE transmits a handover complete message to the target BS, or the UE first transmits data by using a PUCCH or PUSCH UL transmit resource.

- When the UE performs a random access procedure on the target BS via protocol layers of a second bearer, receives a RAR message, configures and transmits a handover complete message to the target BS, and then receives acknowledgement with respect to successful delivery of the handover complete message via a MAC layer (HARQ ACK) or a RLC layer (RLC ACK), it may be determined that the second condition is satisfied.
- When the UE performs a random access procedure on the target BS via the protocol layers of the second bearer, receives a RAR message or configures and transmits a handover complete message to the target BS and then first receives allocation of a UL transmit resource from the target BS or first receives an indication of the UL transmit resource, it may be determined that the second condition is satisfied.
- When the source BS performs efficient handover proposed in the disclosure, the source BS may determine when to discontinue transmission of DL data to the UE or when to release connection to the UE. For example, the source BS may determine whether to discontinue transmission of DL data or when to release connection to the UE, according to a certain method (e.g., when a certain timer is expired (the timer can start after handover is indicated) or the source BS receives, from the target BS, an indication indicating that the UE has successfully performed handover to the target BS). When the UE does not receive DL data from the source BS for a certain time period, the UE may determine that the second condition is satisfied, and may determine that connection to the source BS is released and thus may release the connection.

When the UE receives, from the target BS, an indication (e.g., an RRC message (e.g., an RRCReconfiguration message)) indicating a release of connection to the source BS, or receives, from the target BS, a MAC CE, a RLC control PDU, or a PDCP control PDU, the UE may determine that the second condition is satisfied.

When the UE receives, from the source BS, an indication (e.g., an RRC message (e.g., an RRCReconfiguration message)) indicating a release of connection to the source BS, or receives, from the target BS, a MAC CE, a RLC control PDU, or a PDCP control PDU, the UE may determine that the second condition is satisfied.

When the UE does not receive DL data from the source BS for a certain time period, the UE may determine that the second condition is satisfied.

When the UE successfully completes a random access procedure on the target BS via the layers of the second bearer and then receives allocation of a first UL transmit resource from the target BS or first receives an indication of a UL transmit resource, it may be determined that the second condition is satisfied.

For example, in a case where the UE receives a handover command message from the source BS and receives an indication of a random access to the target BS, when the indicated random access is a Contention Free Random Access (CFRA) (e.g., when a predefined preamble or a UE-cell identifier (e.g., Cell-Radio Network Temporary Identifier (C-RNTI) is allocated), it may be determined that the random access procedure is successfully completed when the UE transmits the predefined preamble to a cell of the target BS and receives a RAR message. Therefore, when the UE receives a first UL transmit resource allocated, or included, or indicated in the RAR message, it may be determined that the second condition is satisfied. As another method, when the UE first receives a UL transmit resource after the UE receives the RAR message, it may be determined that the second condition is satisfied.

In a case where the UE receives a handover command message from the source BS and receives an indication of a random access to the target BS, when the indicated random access is a Contention-Based Random Access (CBRA) (e.g., when a predefined preamble or a UE-cell identifier (e.g., C-RNTI) is not allocated), it may be determined that the random access procedure on the target BS is successfully completed when the UE transmits a preamble (e.g., a random preamble) to a cell of the target BS and receives a RAR message, transmits a message3 (e.g., a handover complete message) to the target BS by using a UL transmit resource allocated, or included, or indicated in the RAR message, and receives, from the target BS, a Contention resolution MAC CE indicating resolution of contention. Therefore, when the UE monitors the PDCCH and first receives or is first indicated with the UL transmit resource via the PDCCH corresponding to the C-RNTI of the UE, it may be determined that the second condition is satisfied. As another method, when a size of the UL transmit resource allocated in the RAR message is sufficient and thus the UE can transmit the message3 and additionally transmit UL data, the UE may determine that the UE first receives a UL transmit resource and thus may determine that the second condition is satisfied. In other words, when the UE receives a RAR message, the UE may determine that the UE first receives the UL transmit resource and thus may determine that the second condition is satisfied.

When a handover method (RACH-less handover) that does not require a random access procedure is also indicated in the handover command message received by the UE, and when the handover command message includes a UL transmit resource with respect to the target BS, the UE transmits a message3 (e.g., a handover complete message or a RRCReconfigurationComplete message) by using the UL transmit resource with respect to the target BS, and when the UE receives, from the target BS, a UE Identity Confirmation MAC CE, it may be determined that a random access procedure is successfully completed and the second condition is satisfied. As another method, when the random access procedure is successfully completed and then the UE performs PDCCH monitoring and receives a first UL transmit resource via the PDCCH corresponding to the C-RNTI of the UE, it may be determined that the second condition is satisfied.

When the handover command message does not include the UL transmit resources with respect to the target BS, the UE performs PDCCH monitoring on the target BS (or a cell) and when the UE receives a UL transmit resource via the PDCCH corresponding to the C-RNTI of the UE, or transmits a message3 (e.g., a handover complete message or a RRCReconfigurationComplete message) by using the UL transmit resource, and receives a UE Identity Confirmation MAC CE from the target BS, it may be determined that a random access procedure is successfully completed and the second condition is satisfied. As another method, when the random access procedure is successfully completed and then the UE performs PDCCH monitoring and receives a first UL transmit resource via the PDCCH corresponding to the C-RNTI of the UE, it may be determined that the second condition is satisfied.

In a case where the UE performs Embodiment 2 of the efficient handover method (e.g., the DAPS handover method) proposed in the disclosure, when it is identified that the RRC layer, the MAC layer, or the RLC layer of the first bearer of the UE for the source BS, and the RRC layer, the MAC layer, or the RLC layer of the second bearer of the UE for the target BS satisfy the second condition proposed in the disclosure, an indicator indicating that the second condition is satisfied may be indicated to a PDCP layer of the UE or a bearer which performs the DAPS handover method. When the PDCP layer of the UE receives, from a lower layer or an upper layer, the indicator indicating that the second condition is satisfied, the UE may perform one or more procedures below, thereby performing Embodiment 2 of the efficient handover method proposed in the disclosure.

The UE may release the first bearer for the source BS and may release connection to the source BS.

When the UE releases connection to the source BS, in order to report, to the target BS, a reception status of a plurality of items of DL data received from the source BS, the UE may trigger a PDCP status report procedure, may configure a PDCP status report, and may transmit the PDCP status report to the target BS.

When the second condition is satisfied, the UE may switch a second PDCP layer architecture or function $1i$-20 (see FIG. 1I) to a first PDCP layer architecture or function 1*i*-11 or 1*i*-12 (see FIG. 1I) proposed in the disclosure with respect to each bearer or a bearer for which the DAPS handover method is indicated. The UE may initialize a variable for realignment, may stop and reset the realignment timer, may perform a deciphering procedure or header (or data) decompression by applying a security key or header decompression context for the source BS to a plurality of items of data (e.g., a plurality of items of data received from the source BS) stored for reordering in the buffer, and may discard the security key or the header decompression context for the source BS. The UE may provide the plurality of items of processed data to the upper layer in ascending order. In other words, when the second condition is satisfied, the UE may perform the deciphering procedure or header (or data) decompression by applying the security key or header decompression context for the source BS to the plurality of items of data (e.g., the plurality of items of data received from the source BS) stored for reordering in the buffer, and may discard the security key or the header decompression context for the source BS. As another method, when the second condition is satisfied, the UE may switch the second PDCP layer architecture or function 1*i*-20 to a third PDCP layer architecture or function 1*i*-30 (see FIG. 1I) proposed in the disclosure with respect to each bearer or a bearer for which the DAPS handover method is indicated. Also, the UE may not stop nor initialize but may continuously use the variable for realignment and the realignment timer. However, the UE may perform the deciphering procedure or header (or data) decompression by applying the security key or header decompression context for the source BS to the plurality of items of data (e.g., the plurality of items of data received from the source BS) stored for reordering in the buffer, and may discard the security key or the header decompression context for the source BS. The UE may provide the plurality of items of processed data to the upper layer in ascending order. In other words, when the second condition is satisfied, the UE may perform the deciphering procedure or header (or data) decompression by applying the security key or header decompression context for the source BS to the plurality of items of data (e.g., the plurality of items of data received from the source BS) stored for reordering in the buffer, and may discard the security key or the header decompression context for the source BS. The UE may release QoS mapping information of the SDAP layer for the source BS, security key information of the PDCP layer for the source BS, header (or data) compression context information for the source BS, or the RLC layer or the MAC layer for the source BS.

When the source gNB 1*f*-02 in FIG. 1F of the disclosure transmits the handover command message to the UE 1*f*-01 (operation 1*f*-20), the source gNB 1*f*-02 may define indicators related to embodiments of the disclosure in the handover command message (e.g., an RRCReconfiguration message), and may indicate, to the UE 1*f*-01, which handover procedure corresponding to which embodiment is to be triggered. The UE 1*f*-01 may perform a handover procedure according to a handover method indicated in the handover command message. For example, the UE 1*f*-01 may perform handover to the target gNB 1*f*-03 in a manner that the UE 1*f*-01 minimizes a data interruption time by performing Embodiment 2 (the DAPS handover method) of the efficient handover method proposed in the disclosure. As another method, the source gNB 1*f*-02 may define indicators for respective bearers, the indicators being related to embodiments of the disclosure, in the handover command message, and may further particularly indicate which embodiment is to be applied to which bearer in handover. For example, the source gNB 1*f*-02 may indicate, via the handover command message, to apply Embodiment 2 of the disclosure only to the AM bearer in which the RLC layer operating in the AM mode is active, or may extensively apply Embodiment 2 to the UM bearer in which the RLC layer operating in the UM mode is active. It is assumed that embodiments of the disclosure are applied to a DRB.

However, when required (e.g., in a case where the UE fails to perform handover to the target BS while the UE maintains a SRB with respect to the source BS, and thus the UE can report a handover failure message via the SRB with respect to the source BS or can recover a connection to the source BS, embodiments of the disclosure may be extensively applied to the SRB.

In embodiments of the disclosure, when the UE performs data transmission and reception to and from the source BS via the protocol layers of the first bearer and performs data transmission and reception to and from the target BS via the protocol layers of the second bearer, the MAC layer of the first bearer and the MAC layer of the second bearer may each operate a discontinuous reception (DRX) period, thereby reducing battery consumption in the UE. In other words, even after the UE receives the handover command message, the UE may continuously apply the DRX period of the MAC layer that was applied when transmitting and receiving data via the protocol layers of the first bearer, and may discontinue the DRX period according to the first condition or the second condition. Also, the UE may manage, in response to indication from the target BS, whether to separately apply the DRX period to the MAC layer of the second bearer.

In the disclosure, the UE discontinuing UL transmission to the source BS via the protocol layers of the first bearer and discontinuing DL data reception from the source BS may mean that the UE re-establishes, initializes, or releases the protocol layers (the PHY layer, the MAC layer, the RLC layer, or the PDCP layer) of the first bearer.

In embodiments of the disclosure, for convenience of description, it is described that the UE configures the first bearer for the source BS or the second bearer for the target BS, and embodiments of the disclosure may be easily extended and equally applied to a case in which the UE configures a plurality of first bearers for the source BS or a plurality of second bearers for the target BS. Also, embodiments of the disclosure may be extended and equally applied to a case in which a plurality of bearers for a plurality of target BSs are configured. For example, the UE may configure second bearers while performing a handover procedure on a first target BS, and when handover fails, the UE configures second bearers while performing a handover procedure on a second target BS, such that the UE may autonomously detect and determine cells satisfying a certain condition (e.g., a signal whose strength being equal to or greater than a certain value) from among a plurality of cells, may select one cell and then may perform a handover procedure on the cell..

Figure 1I:
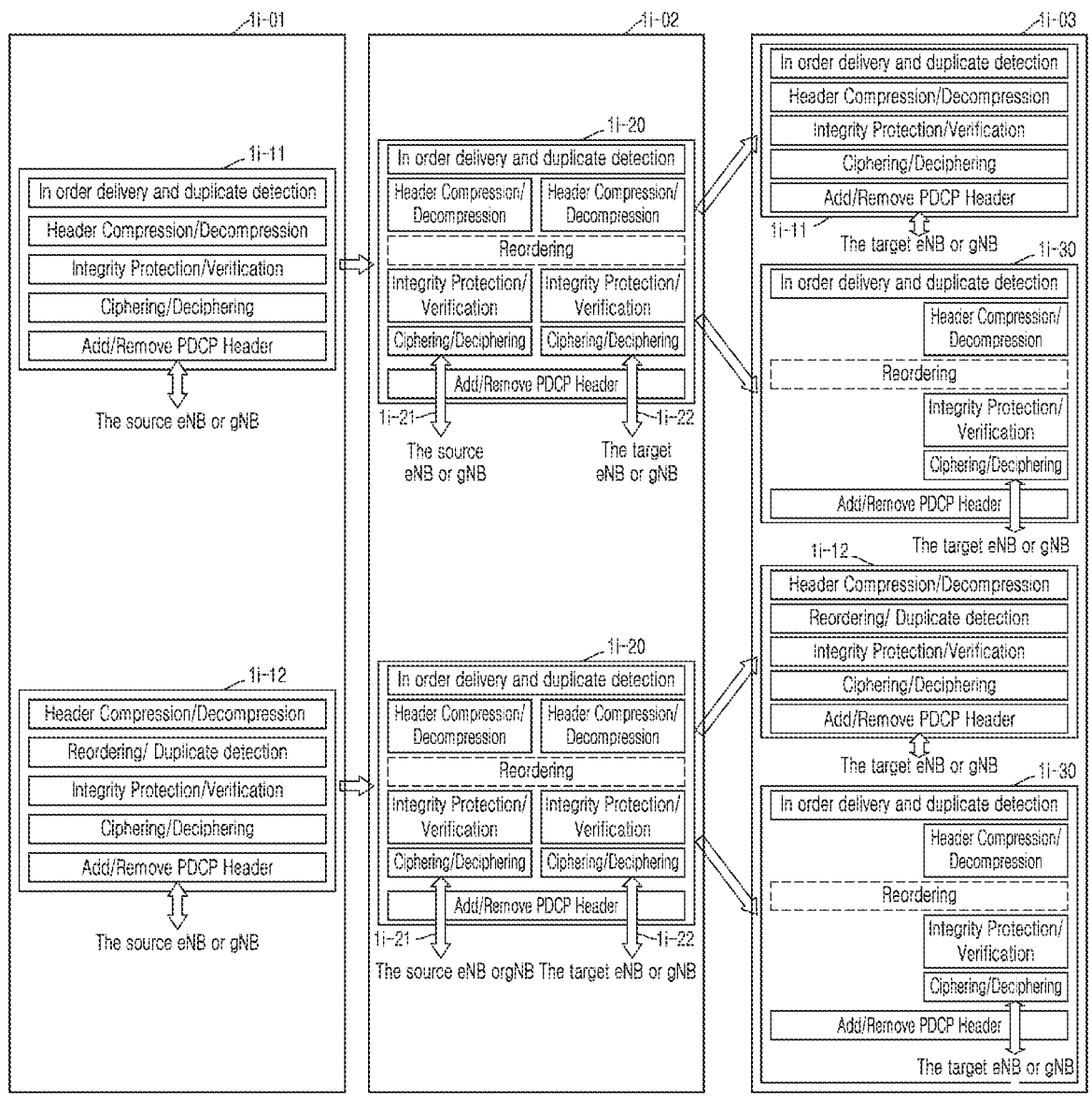
FIG. 1I illustrates architectures of an efficient Packet Data Convergence Protocol (PDCP) layer which are to be applied to a Dual Active Protocol Stack (DAPS) handover method that is Embodiment 2 of the efficient handover method proposed in the disclosure, and a method of applying the architectures, according to an embodiment of the disclosure.

FIG. 1I illustrates architectures of an efficient PDCP layer which are to be applied to the DAPS handover method that is Embodiment 2 of the efficient handover method proposed in the disclosure, and a method of applying the architectures, according to an embodiment of the disclosure.

In FIG. 1I, the disclosure proposes particular architectures and functions of the efficient PDCP layer which are to be applied to the DAPS handover method that is Embodiment 2 of the efficient handover method proposed in the disclosure, and when a DAPS handover procedure is performed, different PDCP layer architectures as the architectures of the PDCP layer to be proposed below may be applied to each bearer at different time points.

For example, before the UE receives a handover command message from a BS, the UE may process and transmit or receive data by applying the first PDCP layer architecture and functions 1*i*-11 or 1*i*-12 proposed in the disclosure to each bearer (operation 1*i*-01).

However, when the UE receives a handover command message from the BS, and the DAPS handover method proposed in the disclosure is indicated in the handover command message or the DAPS handover method is indicated for particular bearers, the UE may process and transmit or receive data by applying the second PDCP layer architecture and function 1*i*-20 proposed in the disclosure with respect to each bearer or bearers for which the DAPS handover method is indicated (operation 1*i*-02). In other words, when the UE receives the handover command message from the BS, and the DAPS handover method proposed in the disclosure is indicated in the handover command message or the DAPS handover method is indicated for particular bearers, the UE may switch the first PDCP layer architecture or function 1*i*-11 or 1*i*-12, which is used for each bearer, to the second PDCP layer architecture or function 1*i*-20 proposed in the disclosure with respect to each bearer or a bearer for which the DAPS handover method is indicated. As another method, when the first condition proposed in the disclosure is satisfied, the UE may switch the first PDCP layer architecture or function 1*i*-11 or 1*i*-12, which is used for each bearer, to the second PDCP layer architecture or function 1*i*-20 proposed in the disclosure with respect to each bearer or a bearer for which the DAPS handover method is indicated (operation 1*i*-02). Also, in a case where the UE receives the handover command message from the BS, and the DAPS handover method proposed in the disclosure is indicated in the handover command message, the DAPS handover method is indicated for particular bearers, or a PDCP realignment timer value is newly set, when the UE switches the first PDCP layer architecture or function 1*i*-11 or 1*i*-12 to the second PDCP layer architecture or function 1*i*-20 proposed in the disclosure with respect to each bearer or a bearer for which the DAPS handover method is indicated, the UE may update a variable for realignment to a PDCP SN or a COUNT value, which is predicted to be received next, and may stop and restart a realignment timer.

When the second condition proposed in the disclosure is satisfied when the UE performs the DAPS handover method proposed in the disclosure, the UE may release, from first bearers for the source BS, the second PDCP layer architecture and function 1*i*-20 applied to each bearer or a bearer for which the DAPS handover method is indicated, and may switch back to the first PDCP layer architecture and function 1*i*-11 or 1*i*-12 and may apply the first PDCP layer architecture and function 1*i*-11 or 1*i*-12 to each bearer. In a case where the second condition is satisfied, when the UE switches the second PDCP layer architecture or function 1*i*-20 (see FIG. 1I) to the first PDCP layer architecture or function 1*i*-11 or 1*i*-12 (see FIG. 1I) proposed in the disclosure with respect to each bearer or a bearer for which the DAPS handover method is indicated, the UE may initialize a variable for realignment, may stop and reset the realignment timer, may perform a deciphering procedure or header (or data) decompression by applying a security key or header decompression context for the source BS to a plurality of items of data (e.g., a plurality of items of data received from the source BS) stored for reordering in the buffer, and may discard the security key or the header decompression context for the source BS. The UE may provide the plurality of items of processed data to the upper layer in ascending order. In other words, when the second condition is satisfied, the UE may perform the deciphering procedure or header (or data) decompression by applying the security key or header decompression context for the source BS to the plurality of items of data (e.g., the plurality of items of data received from the source BS) stored for reordering in the buffer, and may discard the security key or the header decompression context for the source BS.

As another method, when the second condition proposed in the disclosure is satisfied when the UE performs the DAPS handover method proposed in the disclosure, the UE may release, from bearers for the source BS, the second PDCP layer architecture and function 1*i*-20 applied to each bearer or a bearer for which the DAPS handover method is indicated, and may switch to the third PDCP layer architecture and function 1*i*-30 and may apply the third PDCP layer architecture and function 1*i*-30 to each bearer. In a case where the second condition is satisfied, when the UE switches the second PDCP layer architecture or function 1*i*-20 to the third PDCP layer architecture or function 1*i*-30 proposed in the disclosure with respect to each bearer or a bearer for which the DAPS handover method is indicated, the UE may not stop nor initialize but may continuously use the variable for realignment and the realignment timer. However, the UE may perform the deciphering procedure or header (or data) decompression by applying the security key or header decompression context for the source BS to the plurality of items of data (e.g., the plurality of items of data received from the source BS) stored for reordering in the buffer, and may discard the security key or the header decompression context for the source BS. The UE may provide the plurality of items of processed data to the upper layer in ascending order. In other words, when the second condition is satisfied, the UE may perform the deciphering procedure or header (or data) decompression by applying the security key or header decompression context for the source BS to the plurality of items of data (e.g., the plurality of items of data received from the source BS) stored for reordering in the buffer, and may discard the security key or the header decompression context for the source BS.

As proposed in FIG. 1I of the disclosure, the UE may apply, to each bearer, the first PDCP layer architecture or function 1*i*-11 or 1*i*-12, the second PDCP layer architecture or function 1*i*-20, or the third PDCP layer architecture or function 1*i*-30, which are different from each other, at different time points, such that data loss may be prevented and a data interruption time may be minimized when handover is performed.

The first PDCP layer architecture 1*i*-*i*1 or 1*i*-12 proposed in FIG. 1I may have a 1-1 PDCP layer architecture, a 1-2 PDCP layer architecture, a 1-3 PDCP layer architecture, or a 1-4 PDCP layer architecture, which are proposed in the disclosure, and may have characteristics to be described below.

-1>(When it is the 1-1 PDCP layer architecture) for example, when the UE applies the first PDCP layer architecture and function 1*i*-11 to a PDCP layer (e.g., E-UTRA PDCP layer or LTE PDCP layer) connected to an AM RLC layer (e.g., E-UTRA AM RLC layer), the PDCP layer may have characteristics below.

*2>The reception PDCP layer may first perform detection of out-of-window data or duplicate data on a plurality of items of received data. (Retransmission may occur in RLC AM, and sizes of LTE RLC SN and PDCP SN may be different, such that the duplicate data or the out-of-window data may be received. In the above, window indicates a range of PDCP SNs or COUNT values, in which valid data is received.)

3>Before the UE discards the out-of-window data or the duplicate data, the UE performs a deciphering procedure and a header decompression procedure and then performs a discard operation. (Because the data may include useful information (e.g., initialization and refresh (IR) packet or header compression information) for the header decompression procedure, the UE may check and then discard the data.

*2>The PDCP layer may immediately decipher a plurality of items of data without ordering, the data being received without being discarded, and may perform a header decompression procedure. This is because the E-UTRA AM RLC layer performs ordering on the plurality of items of data and provides the plurality of items of data to the PDCP layer.

*2>Then, the PDCP layer provides the plurality of items of data to an upper layer in ascending order of COUNT values.

-1>(When it is the 1-2 PDCP layer architecture) for example, when the UE applies the first PDCP layer architecture and function 1*i*-11 to a PDCP layer (e.g., E-UTRA PDCP layer or LTE PDCP layer) connected to a UM RLC layer (e.g., E-UTRA UM RLC layer), the PDCP layer may have characteristics below.

*2>The PDCP layer may not perform a procedure of detecting out-of-window data or duplicate data. This is because the UM E-UTRA RLC layer does not perform a retransmission procedure.

*2>Then, the PDCP layer may immediately perform a deciphering procedure and then a header decompression procedure on the plurality of items of received data.

*2>Then, the PDCP layer may perform a reordering procedure and may provide the plurality of items of data to the upper layer (e.g., in ascending order).

-1>(When it is the 1-3 PDCP layer architecture) for example, when the UE applies the first PDCP layer architecture 1*i*-11 to the PDCP layer (e.g., the E-UTRA PDCP layer or the LTE PDCP layer) configured with a split bearer, a packet duplication bearer, or a LTE WLAN Aggregation (LWA) bearer, a reordering procedure and a realignment timer may always be applied and the PDCP layer may have characteristics below.

*2>The PDCP layer may first perform detection of out-of-window data or duplicate data on a plurality of items of received data. (Retransmission may occur in RLC AM, data may be received at different time points from different RLC layers, and sizes of LTE RLC SN and PDCP SN may be different, such that the out-of-window data or the duplicate data may be received.)

3>The PDCP layer performs a deciphering procedure. However, the PDCP layer may not perform a header decompression procedure. (This is because the E-UTRA PDCP layer cannot configure a header compression protocol to the split bearer or the LWA bearer).

3>When an integrity protection or verification procedure has been performed, the PDCP layer may perform the integrity protection or verification procedure and then may discard data. When the integrity verification procedure fails, the PDCP layer may discard the data and may report the failure to an upper layer.

3>The PDCP layer discards the out-of-window data or the duplicate data.

*2>When the data is not discarded, the PDCP layer may immediately perform a deciphering procedure without reordering on a plurality of items of received data.

Afterward, when the integrity protection or verification procedure is configured, the PDCP layer may perform integrity verification. When an integrity protection or verification procedure has been performed, the PDCP layer may perform the integrity protection or verification procedure and then may discard data. When the integrity verification procedure fails, the PDCP layer may discard the data and may report the failure to an upper layer.

*2>Afterward, the PDCP layer may perform reordering on a plurality of items of received data, and when PDCP SNs or COUNT values are sequentially aligned in ascending order without a gap therebetween, the PDCP layer may perform a header compression procedure (when the header compression procedure or a header decompression procedure is configured) and may provide the data to the upper layer in ascending order.

*2>In a case where a realignment timer is running,

3>when data is provided to the upper layer, the data corresponding to COUNT value having the same value as a value obtained by subtracting 1 from a value a variable for realignment maintains, or when the plurality of items of data are all provided to the upper layer without a gap between PDCP SNs (COUNT values), 4>the PDCP layer stops and resets the realignment timer.

*2>In a case where the realignment timer is not running,

3>when a buffer stores data that is not provided to the upper layer, or when there is a gap between PDCP SNs (COUNT values), 4>the PDCP layer starts the realignment timer.

4>Then, the PDCP layer updates the variable for realignment to a PDCP SN or a COUNT value which is predicted to be received next time.

*2>In a case where the realignment timer is expired,

3>when a header decompression procedure is configured to values of a plurality of items of stored data, the values being smaller than the variable for realignment, in ascending order of PDCP SNs or COUNT values, the PDCP layer performs the header decompression procedure and provides the data to the upper layer.

3>When a header decompression procedure is configured to values of a plurality of items of stored data, the values being equal to or greater than the variable for realignment, in ascending order of PDCP SNs or COUNT values, the PDCP layer performs the header decompression procedure and provides the data to the upper layer.

3>Then, the PDCP layer updates a variable value of data, which is most recently provided to the upper layer, to a PDCP SN or a COUNT value of the data most recently provided to the upper layer.

3>When a buffer stores data that is not provided to the upper layer, or when there is a gap between PDCP SNs (COUNT values), 4>the PDCP layer starts the realignment timer.

4>Then, the PDCP layer updates the variable for realignment to a PDCP SN or a COUNT value which is predicted to be received next time.

-1>(When it is the 1-4 PDCP layer architecture) for example, when the UE applies the first PDCP layer architecture and function 1*i*-12 to an NR PDCP layer, the PDCP layer may always apply a reordering procedure and a realignment timer and may have characteristics below.

*2>The PDCP layer may first perform a deciphering procedure on a plurality of items of received data.

*2>When an integrity protection or verification procedure is configured, the PDCP layer may perform the integrity protection or verification procedure on the received data, and when the integrity verification procedure fails, the PDCP layer may discard the data and may report the failure to an upper layer.

*2>The PDCP layer performs detection of out-of-window data or duplicate data on the received data. (The disclosure may be characterized in that the deciphering procedure is first performed and then the detection of out-of-window data or duplicate data is performed. As another method, the deciphering procedure may be performed only when the integrity protection or verification procedure is configured. In a case where the detection of out-of-window data or duplicate data is performed but the integrity protection or verification procedure is not configured, the deciphering procedure may be performed only on a plurality of items of data on which the detection of out-of-window data or duplicate data is performed and that are not discarded.)

3>The PDCP layer discards the out-of-window data or the duplicate data.

*2>When the data is not discarded, the PDCP layer may perform reordering on a plurality of items of received data, and when PDCP SNs or COUNT values are sequentially aligned in ascending order without a gap therebetween, the PDCP layer may perform a header compression procedure (when the header compression procedure or a header decompression procedure is configured) and may provide the data to the upper layer in ascending order.

*2>Then, the UE provides the plurality of items of data to an upper layer in ascending order of COUNT values.

*2>In a case where a realignment timer is running,

3>when data is provided to the upper layer, the data corresponding to COUNT value having the same value as a value obtained by subtracting 1 from a value a variable for realignment maintains, when the plurality of items of data are all provided to the upper layer without a gap between PDCP SNs (COUNT values), or when a value of a variable storing a PDCP SN or a COUNT value of data to be provided to the upper layer is equal to or greater than a value of a variable for realignment, 4>the PDCP layer stops and resets the realignment timer.

*2>In a case where the realignment timer is not running,

3>when a buffer stores data that is not provided to the upper layer, when there is a gap between PDCP SNs (COUNT values), or when a value of a variable storing a COUNT value of first data that is not provided to the upper layer is smaller than a value of a variable for realignment, 4>the PDCP layer updates the variable for realignment to a PDCP SN or a COUNT value which is predicted to be received next time.

4>The PDCP layer starts the realignment timer.

*2>In a case where the realignment timer is expired,

3>when a header decompression procedure is configured to values of a plurality of items of stored data, the values being smaller than the variable for realignment, in ascending order of PDCP SNs or COUNT values, the PDCP layer performs the header decompression procedure and provides the data to the upper layer.

3>When a header decompression procedure is configured to values of a plurality of items of stored data, the values being equal to or greater than the variable for realignment, in ascending order of PDCP SNs or COUNT values, the PDCP layer performs the header decompression procedure and provides the data to the upper layer.

3>Then, the PDCP layer updates a variable value of first data, which is not provided to the upper layer, to a PDCP SN or a COUNT value of the first data that is not provided to the upper layer.

3>When a buffer stores data that is not provided to the upper layer, when there is a gap between PDCP SNs (COUNT values), or when a value of a variable storing a COUNT value of first data that is not provided to the upper layer is smaller than a value of a variable for realignment, 4>the PDCP layer updates the variable for realignment to a PDCP SN or a COUNT value which is predicted to be received next time.

4>The PDCP layer starts the realignment timer.

The second PDCP layer architecture or function $1i$-20 proposed in FIG. 1I may have a 2-1 PDCP layer architecture or a 2-2 PDCP layer architecture, which are proposed in the disclosure, and may have characteristics to be described below.

In the disclosure, provided is the second PDCP layer architecture $1i$-20 which is efficient in handover. The second PDCP layer architecture may be applied to Embodiment 2 of the efficient handover method for minimizing a data interruption time, which is proposed in the disclosure.

In the second PDCP layer architecture, the UE may perform data transmission or reception from or to a source BS $1i$-21 via protocol layers (e.g., a SDAP layer, a PDCP layer, a RLC layer, or a MAC layer) of a first bearer, and may perform data transmission or reception from or to a target BS $1i$-22 via protocol layers (e.g., a SDAP layer, a PDCP layer, a RLC layer, or a MAC layer) of a second bearer.

The PDCP layer of the first bearer and the PDCP layer of the second bearer may each be configured in the UE but may logically operate as one PDCP layer as shown in $1i$-20. In detail, by distinguishing between functions of a PDCP layer, the one PDCP layer may be implemented as functions (e.g., an SN allocation function, a realignment function, an in-sequence delivery function, or a duplicate detection function) of an upper PDCP layer and functions (e.g., a deciphering or ciphering function, a header (or data) compression or decompression function, an integrity protection or verification function, or a duplicate detection function) of two lower PDCP layers respectively for the source BS and the target BS. Also, as proposed above, when the DAPS handover method is performed, the UE may transmit UL data transmission to the source BS, and when the first condition is satisfied, the UE may switch to the target BS and may continuously receive DL data from the source BS and the target BS. Therefore, only one header (or data) compression protocol context for the source BS or the target BS may be maintained and applied to a UL, and two contexts for the source BS or the target BS may be maintained and applied to a DL.

The 2-1 PDCP layer architecture (e.g., an E-UTRA PDCP layer for the DAPS handover method) proposed in the disclosure, based on the second PDCP layer architecture, may have characteristics below.

An upper transmit PDCP layer function may serve to allocate PDCP SNs to a plurality of items of data received from an upper layer. Two lower transmit PDCP layer functions $1i$-21 and $1i$-22 respectively for the source BS and the target BS may apply, to data to be transmitted to the source BS, header (or data) compression context or security key configured with the source BS, by using a separate security key configured with each of the source BS and the target BS, and apply, to data to be transmitted to the target BS, header (or data) compression context or security key configured with the target BS, and may apply a header (or data)

compression procedure when the header (or data) compression procedure is configured. Also, when integrity protection is configured, the lower transmit PDCP layer functions 1*i*-21 and 1*i*-22 may apply a ciphering procedure by applying an integrity protection procedure to a PDCP header and data (PDCP SDU), may provide the data to be transmitted to the source BS to a transmit RLC layer of the first bearer, and may provide the data to be transmitted to the target BS to a transmit RLC layer of the second bearer, thereby performing transmission. In order to accelerate a data processing speed, the two lower transmit PDCP layer functions 1*i*-21 and 1*i*-22 may perform parallel processing to perform header compression, integrity protection, or a ciphering procedure in parallel. Also, the two lower transmit PDCP layer functions 1*i*-21 and 1*i*-22 may perform the integrity protection or the ciphering procedure by using different security keys. Also, the two lower transmit PDCP layer functions 1*i*-21 and 1*i*-22 may perform compression, integrity protection, or a ciphering procedure on different data by applying different compression contexts, different security keys, or different security algorithms in a logically-one transmit PDCP layer.

A receive PDCP layer function, namely, the lower receive PDCP layer functions 1*i*-21 and 1*i*-22 for the source BS or the target BS, may each independently perform an out-of-window data detection or duplicate detection procedure on data respectively received from lower layers, in particular, a plurality of items of data received from two RLC layers for each of the source BS and the target BS, based on PDCP SNs or COUNT values. As another method, for convenience of implementation, the receive PDCP layer function may perform the out-of-window data detection or duplicate detection procedure on all received data, without distinguishing between the RLC layers, based on PDCP SNs or COUNT values. As another method, for more accurate duplicate detection, the receive PDCP layer function may perform the out-of-window data detection based on PDCP SNs or COUNT values on all received data, without distinguishing between the RLC layers, and may separately perform the duplicate detection procedure on a plurality of items of data received from each of the RLC layers. As another method, when data received from different BSs are overlapped with each other, in order to prevent data loss for a header compression protocol, the receive PDCP layer function may perform the out-of-window data detection based on PDCP SNs or COUNT values on all received data without distinguishing between the RLC layers, and may perform the duplicate detection procedure on all data after a deciphering procedure, an integrity protection procedure, or a header (or data) decompression procedure is received with respect to data received from each of the RLC layers.

When a deciphering procedure is immediately applied to a plurality of items of received data by using separate header (or data) compression context or security key separately configured with the source BS and the target BS and integrity protection is configured, sub-functions of the receive PDCP layer may apply an integrity protection procedure to the PDCP header and the data (PDCP SDU).

In the 2-1 PDCP layer architecture, a header (or data) decompression procedure may be immediately performed, without reordering, on a plurality of items of data received from RLC layers of the first bearer for the source BS, and a header (or data) decompression procedure may be immediately performed, without reordering, on a plurality of items of data received from RLC layers of the second bearer for the target BS. Also, to distinguish between the data received from the RLC layers of the first bearer for the source BS and the data received from the RLC layers of the second bearer for the target BS, an indicator is defined for each of the received data such that it is possible to identify whether the PDCP layer received data from the source BS or received data from the target BS. As another method, a 1-bit indicator is defined in a PDCP header, a SDAP header, or a RLC header, such that it is possible to identify whether the PDCP layer received data from the source BS or received data from the target BS. Also, the PDCP layer may perform the duplicate detection procedure based on a PDCP SN or a COUNT value (a procedure in which only one data (including pre-received data or data provided to the upper layer) is allocated for each PDCP SN or each COUNT value and the others are all discarded) on all of the data received from RLC layers of the first bearer for the source BS and the data received from RLC layers of the second bearer for the target BS, wherein the header (or data) compression procedure has been completed with respect to the data. Then, the PDCP layer may perform a realignment procedure on all of the data received from RLC layers of the first bearer for the source BS and the data received from RLC layers of the second bearer for the target BS, in ascending order, based on PDCP SNs or COUNT values, and may sequentially provide the data to the upper layer. Because one PDCP layer can receive data in any order from different BSs, i.e., from the first bearer or the second bearer, the PDCP layer may have to always perform the realignment procedure.

As described above, to accelerate a data processing speed, the two lower transmit PDCP layer functions 1*i*-21 and 1*i*-22 may perform parallel processing to perform header compression, integrity protection, or a ciphering procedure in parallel, based on each PDCP SN or each COUNT value. Also, the two lower transmit PDCP layer functions 1*i*-21 and 1*i*-22 may perform the integrity protection, the ciphering procedure, or the header decompression procedure by using different header (or data) compression contexts or different security keys. Also, the two lower transmit PDCP layer functions 1*i*-21 and 1*i*-22 may perform the integrity protection, the ciphering procedure, or the decompression procedure on different data by applying different header (or data) compression contexts, different security keys, or different security algorithms in a logically-one transmit PDCP layer. Also, the two lower transmit PDCP layer functions 1*i*-21 and 1*i*-22 may perform out-of-sequence deciphering or integrity verification procedure on each of a plurality of items of data received without relation to the order of PDCP SNs or COUNT values.

When the one PDCP layer distinguishes layers of the first bearer from layers of the second bearer, the PDCP layer may distinguish the layers (or a first RLC layer) of the first bearer from the layers (or a second RLC layer) of the second bearer, by taking into consideration that the layer of the first bearer and the layer of the second bearer are connected to different MAC layers, that the layers have different logical channel identifiers or are different RLC layers connected to different MAC layers, or that the layers use different ciphering keys. Accordingly, the PDCP layer may perform a ciphering procedure or a deciphering procedure on UL data and DL data by using different security keys, and may compress or decompress the UL data and the DL data by using different compression protocol contexts.

The 2-2 PDCP layer architecture (e.g., an NR PDCP layer for the DAPS handover method) proposed in the disclosure, based on the second PDCP layer architecture, may have characteristics below.

An upper transmit PDCP layer function may serve to allocate PDCP SNs to a plurality of items of data received from an upper layer. Two lower transmit PDCP layer functions 1*i*-21 and 1*i*-22 respectively for the source BS and the target BS may apply, to data to be transmitted to the source BS, header (or data) compression context or security key configured with the source BS, by using a separate security key configured with each of the source BS and the target BS, and apply, to data to be transmitted to the target BS, header (or data) compression context or security key configured with the target BS, and may apply a header (or data) compression procedure when the header (or data) compression procedure is configured. Also, when integrity protection is configured, the lower transmit PDCP layer functions 1*i*-21 and 1*i*-22 may apply a ciphering procedure by applying an integrity protection procedure to a PDCP header and data (PDCP SDU), may provide the data to be transmitted to the source BS to a transmit RLC layer of the first bearer, and may provide the data to be transmitted to the target BS to a transmit RLC layer of the second bearer, thereby performing transmission. In order to accelerate a data processing speed, the two lower transmit PDCP layer functions 1*i*-21 and 1*i*-22 may perform parallel processing to perform header compression, integrity protection, or a ciphering procedure in parallel. Also, the two lower transmit PDCP layer functions 1*i*-21 and 1*i*-22 may perform the integrity protection or the ciphering procedure by using different security keys. Also, the two lower transmit PDCP layer functions 1*i*-21 and 1*i*-22 may perform compression, integrity protection, or a ciphering procedure on different data by applying different compression contexts, different security keys, or different security algorithms in a logically-one transmit PDCP layer.

A receive PDCP layer function, namely, the lower receive PDCP layer functions 1*i*-21 and 1*i*-22 for the source BS or the target BS, may each independently perform an out-of-window data detection or duplicate detection procedure on data respectively received from lower layers, in particular, a plurality of items of data received from two RLC layers for each of the source BS and the target BS, based on PDCP SNs or COUNT values. As another method, for convenience of implementation, the receive PDCP layer function may perform the out-of-window data detection or duplicate detection procedure on all received data, without distinguishing between the RLC layers, based on PDCP SNs or COUNT values. As another method, for more accurate duplicate detection, the receive PDCP layer function may perform the out-of-window data detection based on PDCP SNs or COUNT values on all received data, without distinguishing between the RLC layers, and may separately perform the duplicate detection procedure on a plurality of items of data received from each of the RLC layers. As another method, when data received from different BSs are overlapped with each other, in order to prevent data loss for a header compression protocol, the receive PDCP layer function may perform the out-of-window data detection based on PDCP SNs or COUNT values on all received data without distinguishing between the RLC layers, and may perform the duplicate detection procedure on all data after a deciphering procedure, an integrity protection procedure, or a header (or data) decompression procedure is received with respect to data received from each of the RLC layers.

When a deciphering procedure is immediately applied to a plurality of items of received data by using separate header (or data) compression context or security key separately configured with the source BS and the target BS and integrity protection is configured, sub-functions of the receive PDCP layer may apply an integrity protection procedure to the PDCP header and the data (PDCP SDU).

In the 2-2 PDCP layer architecture, a reordering procedure may be performed on a plurality of items of data received from RLC layers of the first bearer for the source BS and a plurality of items of data received from RLC layers of the second bearer for the target BS, and then may perform a header (or data) decompression procedure on the plurality of items of data received from each BS (the source BS or the target BS) in ascending order of PDCP SNs or COUNT values, by applying header (or data) compression context of each BS (the source BS or the target BS). Also, to distinguish between the data received from the RLC layers of the first bearer for the source BS and the data received from the RLC layers of the second bearer for the target BS, an indicator is defined for each of the received data such that it is possible to identify whether the PDCP layer received data from the source BS or received data from the target BS. As another method, a 1-bit indicator is defined in a PDCP header, a SDAP header, or a RLC header, such that it is possible to identify whether the PDCP layer received data from the source BS or received data from the target BS. Also, the PDCP layer may perform the duplicate detection procedure based on a PDCP SN or a COUNT value (a procedure in which only one data (including pre-received data or data provided to the upper layer) is allocated for each PDCP SN or each COUNT value and the others are all discarded) on all of the data received from RLC layers of the first bearer for the source BS and the data received from RLC layers of the second bearer for the target BS, wherein the header (or data) compression procedure has been completed with respect to the data. Then, the PDCP layer may sequentially provide, to the upper layer, all of the data received from RLC layers of the first bearer for the source BS and the data received from RLC layers of the second bearer for the target BS, in ascending order, based on PDCP SNs or COUNT values. Because one PDCP layer can receive data in any order from different BSs, i.e., from the first bearer or the second bearer, the PDCP layer may have to always perform the realignment procedure.

As described above, to accelerate a data processing speed, the two lower transmit PDCP layer functions 1*i*-21 and 1*i*-22 may perform parallel processing to perform header compression, integrity protection, or a ciphering procedure in parallel, based on each PDCP SN or each COUNT value. Also, the two lower transmit PDCP layer functions 1*i*-21 and 1*i*-22 may perform the integrity protection, the ciphering procedure, or the header decompression procedure by using different header (or data) compression contexts or different security keys. Also, the two lower transmit PDCP layer functions 1*i*-21 and 1*i*-22 may perform the integrity protection, the ciphering procedure, or the decompression procedure on different data by applying different header (or data) compression contexts, different security keys, or different security algorithms in a logically-one transmit PDCP layer. Also, the two lower transmit PDCP layer functions 1*i*-21 and 1*i*-22 may perform out-of-sequence deciphering or integrity verification procedure on each of a plurality of items of data received without relation to the order of PDCP SNs or COUNT values.

When the one PDCP layer distinguishes layers of the first bearer from layers of the second bearer, the PDCP layer may distinguish the layers (or a first RLC layer) of the first bearer from the layers (or a second RLC layer) of the second bearer, by taking into consideration that the layer of the first bearer and the layer of the second bearer are connected to different MAC layers, that the layers have different logical channel identifiers or are different RLC layers connected to different MAC layers, or that the layers use different ciphering keys. Accordingly, the PDCP layer may perform a ciphering procedure or a deciphering procedure on UL data and DL data by using different security keys, and may compress or decompress the UL data and the DL data by using different compression protocol contexts.

In the disclosure, provided is the third PDCP layer architecture 1*i*-30 which is efficient in handover. The third PDCP layer architecture may be applied to Embodiment 2 of the efficient handover method for minimizing a data interruption time, which is proposed in the disclosure. A PDCP layer function in the third PDCP layer architecture proposed in the disclosure may be equal to that in the second PDCP layer architecture proposed in the disclosure. However, the third PDCP layer architecture may correspond to an architecture from which the first bearer for the source BS in the second PDCP layer architecture is released. In detail, the third PDCP layer architecture proposed in the disclosure may have the same functions as those of the second PDCP layer architecture but may have an architecture from which the first bearer (e.g., the SDAP layer, the PDCP layer, the RLC layer, or the MAC layer) for the source BS in the second PDCP layer architecture is released. Therefore, the third PDCP layer architecture may be characterized in that QoS mapping information of the SDAP layer for the source BS, security key information for the PDCP layer for the source BS, header (or data) compression context information for the source BS, or the RLC layer or the MAC layer for the source BS is released.

Figure 1J:
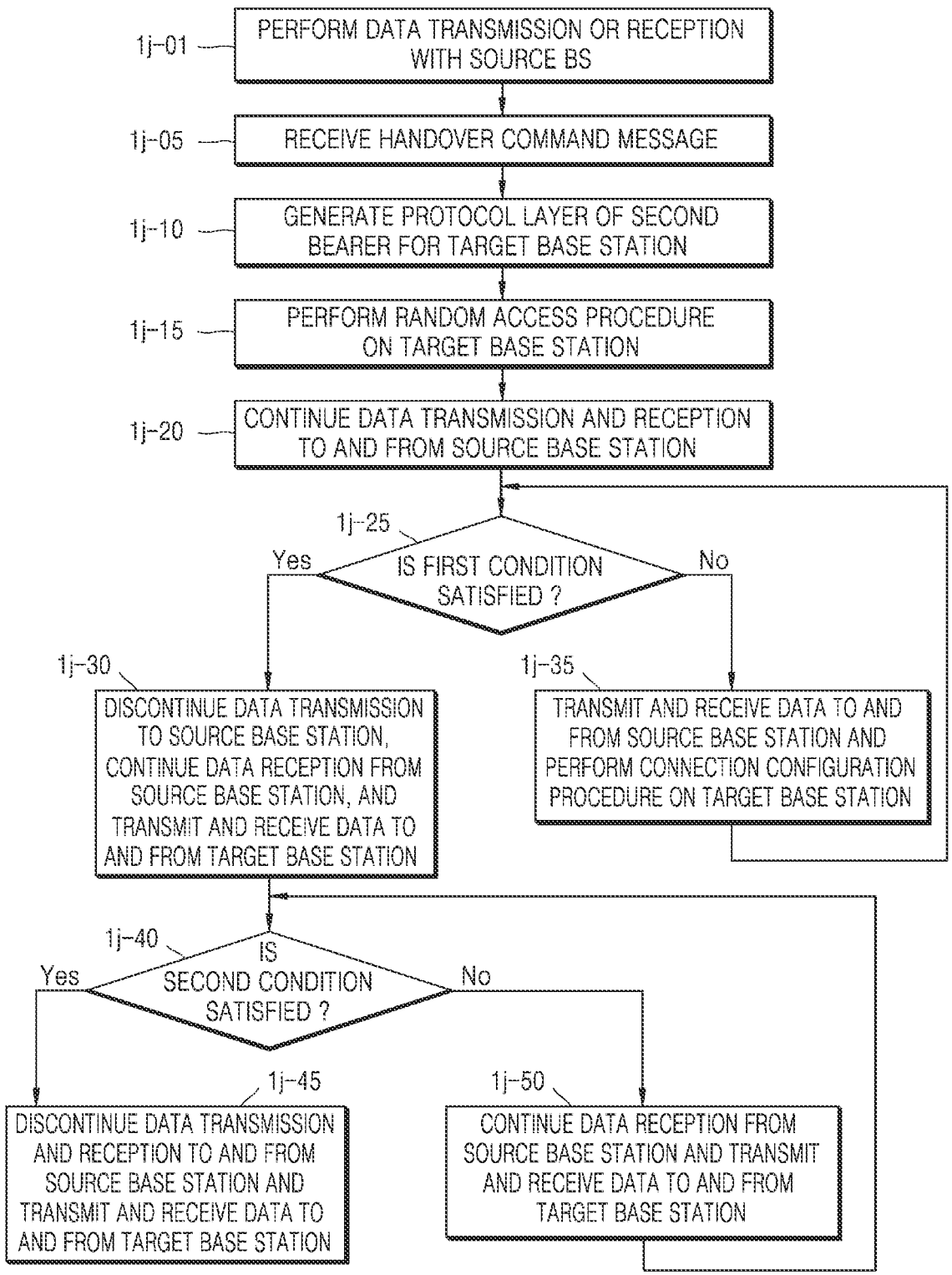
FIG. 1J is a flowchart of operations of a user equipment (UE), according to an embodiment of the disclosure.

FIG. 1J is a flowchart of operations of a UE, according to embodiments of the disclosure.

In FIG. 1J, the UE may perform data transmission or reception to or from a source BS for each bearer via a first PDCP layer architecture (operation 1*j*-01).

However, the UE receives a handover command message (operation 1*j*-50). When the handover command message indicates the DAPS handover method of Embodiment 2 proposed in the disclosure or indicates the DAPS handover method for each bearer, the UE may switch the architecture of a target BS indicated in the handover command message to a second PDCP layer architecture for each bearer or bearers for which the DAPS handover method is indicated. Even when the UE configures and establishes protocol layers of a second bearer, and performs a random access procedure on the target BS via the established protocol layers (operations 1*j*-10 and 1*j*-15), the UE may continuously perform data transmission or reception (UL data transmission and DL data reception) to or from the source BS via protocol layers of a first bearer (operation 1*j*-20).

When the terminal satisfies the first condition of the disclosure (operation 1*j*-25), the UE may discontinue UL data transmission to the source BS via the protocol layers of the first bearer, may transmit UL data to the target BS via the protocol layers of the second bearer by switching the UL data transmission, and may continuously receive DL data from the source BS and the target BS via the protocol layers of the first and second bearers (operation 1*j*-30). Also, a PDCP layer of the second bearer may continuously perform data transmission or reception without interruption to or from the target BS by using data to be transmitted or data to be received, SN information, or header compression and decompression context, which is stored in a PDCP layer of the first bearer. When the terminal does not satisfy the first condition, the UE may continuously check the first condition while continuously performing an ongoing procedure (operation 1*j*-35).

When the terminal satisfies the second condition (operation 1*j*-40), the UE may discontinue DL data reception from the source BS via the protocol layers of the first bearer (operation 1*j*-45). Also, the PDCP layer of the second bearer may continuously perform data transmission or reception without interruption to or from the target BS by using data to be transmitted or data to be received, SN information, or header compression and decompression context, which is stored in the PDCP layer of the first bearer.

When the terminal does not satisfy the second condition (operation 1*j*-40), the UE may continuously check the second condition while continuously performing an ongoing procedure (operation 1*j*-50).

According to an embodiment of the disclosure, a PDCP layer proposed in the disclosure may perform different procedures according to types of handover indicated in a handover command message received by a UE.

When handover indicated in the handover command message the UE receives from a source BS is handover (e.g., a normal handover method) of Embodiment 1, the UE may perform a PDCP re-establishment procedure on the PDCP layer according to each bearer.

When the handover indicated in the handover command message the UE receives from a source BS is handover of Embodiment 2 (or the handover is indicated in the handover command message for each bearer), The UE may perform procedures on each bearer (or a bearer for which Embodiment 2 is indicated), the procedures being proposed in the disclosure on condition that the first condition is satisfied.

When the source BS indicates, to the UE, handover to which embodiments proposed in the disclosure are applied, the source BS may start data forwarding to a target BS when a third condition below is satisfied. The third condition may mean that one or a plurality of conditions from among the conditions below is satisfied.

Figure 1K:
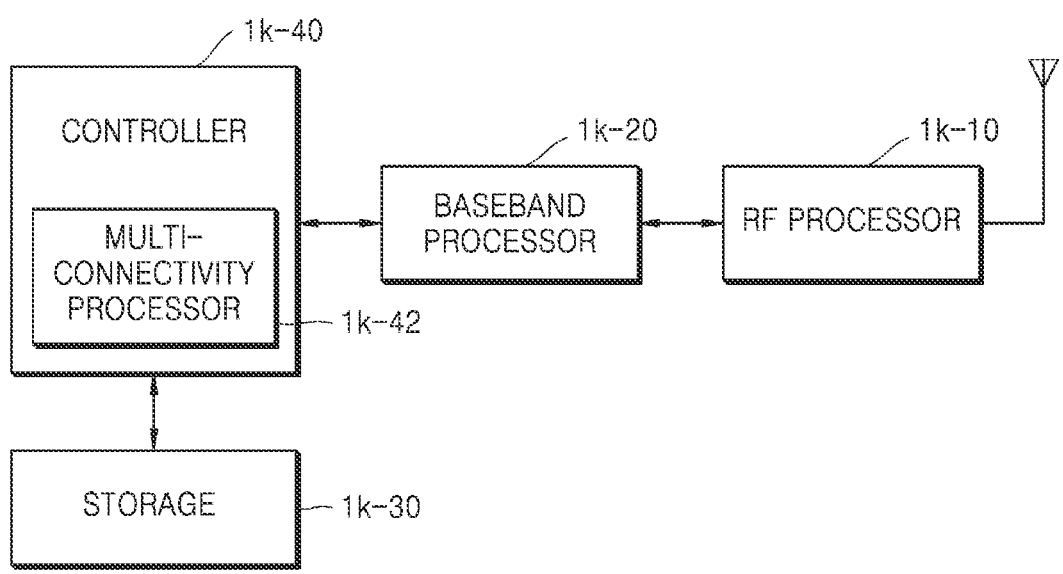
FIG. 1K is a block diagram of a configuration of a UE to which an embodiment of the disclosure is applicable.

In a case where the UE receives, from the target BS, an indication indicating that handover is successfully completed In a case where the source BS transmits a handover command message to the UE In a case where the source BS transmits a handover command message to the UE and acknowledges successful delivery (HARQ ACK or NACK or RLC ACK or NACK) of the handover command message In a case where the source BS receives, from the UE, an indication (e.g., an RRC message (e.g., an RRCReconfiguration message)) indicating that connection to the source BS is to be release, or receives a MAC CE, an RLC control PDU, or PDCP control PDU from the UE In a case where the source BS transmits a handover command message to the UE and drives a certain timer, and then the timer is expired In a case where acknowledgement (HARQ ACK or NACK or RLC ACK or NACK) with respect to successful delivery of DL data is not received from the UE for a certain time FIG. 1K is a block diagram of a configuration of a UE to which an embodiment of the disclosure is applicable.

Referring to FIG. 1K, the UE may include a radio frequency (RF) processor 1*k*-10, a baseband processor 1*k*-20, a storage 1*k*-30, and a controller 1*k*-40. However, this is only an embodiment, and the components included in the UE are not limited thereto.

The RF processor 1*k*-10 may perform functions for transmitting and receiving a signal via a radio channel, such as a band conversion, amplification, and the like of the signal. In other words, the RF processor 1*k*-10 may up-convert a baseband signal provided from the baseband processor 1*k*-20, to an RF band signal and transmit the RF band signal through an antenna, and down-convert an RF band signal received through an antenna, to a baseband signal. For example, the RF processor 1k-10 may include a transmit filter, a receive filter, an amplifier, a mixer, an oscillator, a digital-to-analog converter (DAC), and an analog-to-digital converter (ADC). Although only a single antenna is illustrated in FIG. 1K, the UE may include multiple antennas. The RF processor 1k-10 may include a plurality of RF chains. The RF processor 1k-10 may perform beamforming. For the beamforming, the RF processor 1k-10 may adjust respective phases and amplitudes of signals transmitted or received through multiple antennas or antenna elements. The RF processor 1k-10 may perform an MIMO operation and may receive several layers in the MIMO operation. The RF processor 1k-10 may perform received beam sweeping by appropriately configuring multiple antennas or antenna elements, or may adjust a direction and a beam width of the received beam such that the received beam coordinates with a transmit beam, under the control of the controller 1k-40.

The baseband processor 1k-20 may perform conversion between a baseband signal and a bitstream, based on physical layer specifications of a system. For example, for data transmission, the baseband processor 1k-20 may generate complex symbols by encoding and modulating a transmit bitstream. For data reception, the baseband processor 1k-20 may reconstruct a received bitstream by demodulating and decoding a baseband signal provided by the RF processor 1k-10. For example, according to an orthogonal frequency division multiplexing (OFDM) scheme, for data transmission, the baseband processor 1k-20 may generate complex symbols by encoding and modulating a transmit bitstream, map the complex symbols to subcarriers, and then configure OFDM symbols by performing inverse fast Fourier transform (IFFT) and cyclic prefix (CP) insertion. For data reception, the baseband processor 1k-20 may split a baseband signal provided from the RF processor 1k-10, in OFDM symbol units, reconstruct signals mapped to subcarriers by performing fast Fourier transformation (FFT), and then reconstruct a received bitstream by demodulating and decoding the signals.

The baseband processor 1k-20 and the RF processor 1k-10 transmit and receive signals as described above. Accordingly, each of the baseband processor 1k-20 and the RF processor 1k-10 may also be called a transmitter, a receiver, a transceiver, or a communicator. At least one of the baseband processor 1k-20 or the RF processor 1k-10 may include multiple communication modules to support multiple different radio access technologies. Also, at least one of the baseband processor 1k-20 or the RF processor 1k-10 may include multiple different communication modules to process signals of different frequency bands. For example, the different radio access technologies may include an LTE network, an NR network, etc. The different frequency bands may include a super high frequency (SHF) (e.g., 2.5 GHz and 5 GHz) band and a millimeter wave (mmWave) (e.g., 60 GHz) band.

The storage 1k-30 stores data for operations of the UE, e.g., basic programs, application programs, and configuration information. The storage 1k-30 provides the stored data upon request by the controller 1k-40.

The controller 1k-40 controls all operations of the UE. For example, the controller 1k-40 may transmit and receive signals through the baseband processor 1k-20 and the RF processor 1k-10. The controller 1k-40 writes and reads data to and from the storage 1k-30. To this end, the controller 1k-40 may include at least one processor.

For example, the controller 1k-40 may include a communication processor (CP) performing control for communication, and an application processor (AP) controlling an upper layer, such as an application program.

Figure 1L:
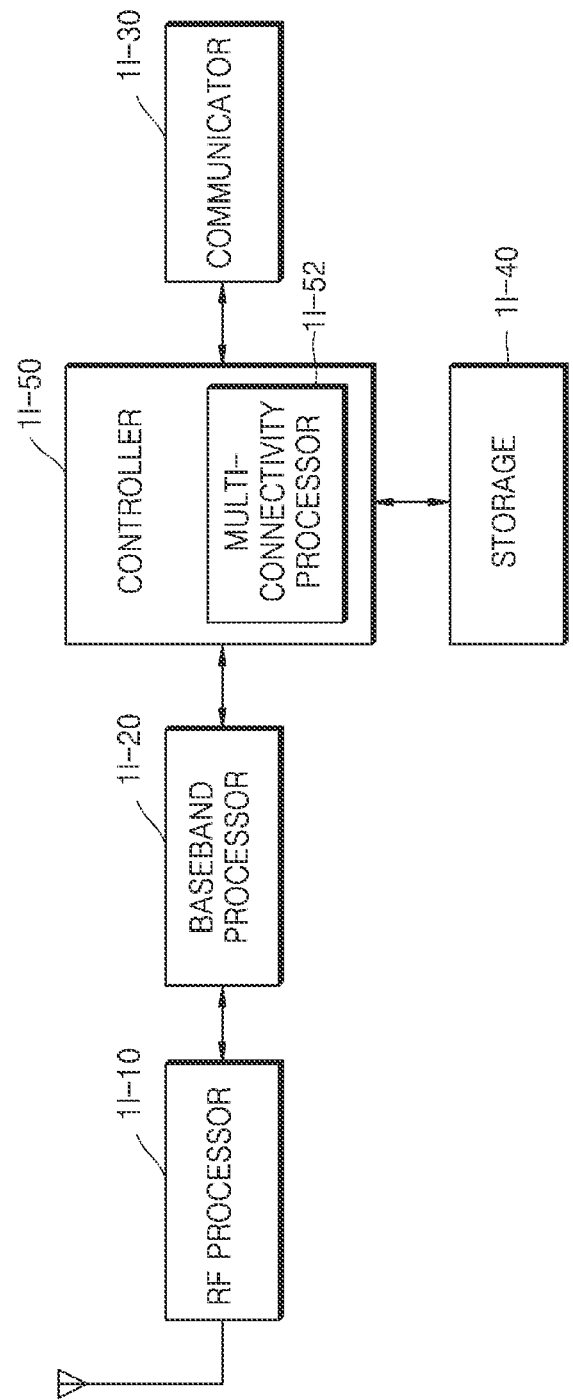
FIG. 1L is a block diagram of a configuration of a base station (BS) in a wireless communication system, to which an embodiment of the disclosure is applicable.

FIG. 1L is a block diagram of a configuration of a BS in a wireless communication system, to which an embodiment of the disclosure is applicable.

Referring to FIG. 1L, the BS may include an RF processor 1l-10, a baseband processor 1l-20, a communicator 1l-30, a storage 1l-40, and a controller 1l-50. However, this is only an embodiment, and the components included in the BS are not limited thereto.

The RF processor 1l-10 may perform functions for transmitting and receiving a signal via a radio channel, such as a band conversion, amplification, and the like of the signal. In other words, the RF processor 1l-10 may up-convert a baseband signal provided from the baseband processor 1l-20, to an RF band signal and transmit the RF band signal through an antenna, and down-convert an RF band signal received through an antenna, to a baseband signal. For example, the RF processor 1l-10 may include a transmit filter, a receive filter, an amplifier, a mixer, an oscillator, a DAC, an ADC, or the like. Although only a single antenna is illustrated in FIG. 1L, the BS may include multiple antennas. The RF processor 1l-10 may include a plurality of RF chains.

The RF processor 1l-10 may perform beamforming. For beamforming, the RF processor 1l-10 may adjust phases and amplitudes of signals transmitted or received through multiple antennas or antenna elements. The RF processor 1l-10 may perform a downlink (DL) MIMO operation by transmitting at least one layer.

The baseband processor 1l-20 may perform conversion between a baseband signal and a bitstream, based on physical layer specifications of a first radio access technology. For example, for data transmission, the baseband processor 1l-20 may generate complex symbols by encoding and modulating a transmit bitstream. For data reception, the baseband processor 1l-20 may reconstruct a received bitstream by demodulating and decoding a baseband signal provided by the RF processor 1l-10.

For example, according to an OFDM scheme, for data transmission, the baseband processor 1l-20 may generate complex symbols by encoding and modulating a transmit bitstream, map the complex symbols to subcarriers, and then configure OFDM symbols by performing IFFT and CP insertion. For data reception, the baseband processor 1l-20 may split a baseband signal provided from the RF processor 1l-10, in OFDM symbol units, reconstruct signals mapped to subcarriers by performing FFT, and then reconstruct a received bitstream by demodulating and decoding the signals. The baseband processor 1l-20 and the RF processor 1l-10 transmit and receive signals as described above. Accordingly, each of the baseband processor 1l-20 and the RF processor 1l-10 may also be called a transmitter, a receiver, a transceiver, a communicator, or a wireless communicator.

The communicator 1l-30 may provide an interface for communicating with other nodes in a network.

The storage 1l-40 stores data for operations of the BS, e.g., basic programs, application programs, and configuration information. In particular, the storage 1l-40 may store information about bearers allocated for a connected UE, a measurement report transmitted from the connected UE, etc. The storage 1l-40 may store criteria information used to determine whether to provide or release multi-connectivity to or from the UE. The storage 1l-40 provides the stored data upon request by the controller 1l-50.

The controller 1I-50 controls all operations of the BS. For example, the controller 1I-50 may transmit and receive signals through the baseband processor 1I-20 and the RF processor 1I-10 or through the communicator 1I-30. The controller 1I-50 writes and reads data to and from the storage 1I-40. To this end, the controller 1I-50 may include at least one processor.

In the disclosure, provided are various efficient handover methods for preventing occurrence of a data interruption time due to handover when the handover is performed in a wireless communication system, such that a service without data interruption may be supported.

What is claimed is:

1. A method performed by a user equipment (UE) in a wireless communication system, the method comprising:
receiving, from a source cell, a radio resource control (RRC) reconfiguration message indicating a handover;
configuring a medium access control (MAC) layer for a target cell based on the RRC reconfiguration message, wherein the RRC reconfiguration message includes information indicating a bearer is configured as a dual active protocol stack (DAPS) bearer,
performing, by the MAC layer for the target cell, a random access procedure on the target cell for a DAPS handover;
indicating, from the MAC layer for the target cell to an RRC layer, an indication of completion of the random access procedure based on completing the random access procedure on the target cell;
switching, by a packet data convergence protocol (PDCP) layer, uplink data for the bearer configured as the DAPS bearer based on receiving, from the RRC layer, a request for uplink data switching; and
transmitting, to the target cell, the uplink data,
wherein in case that the bearer is an acknowledged mode (AM) data radio bearer (DRB), and a first PDCP service data unit (SDU) of the uplink data is not confirmed a successful delivery by a radio link controller (RLC) layer associated with the source cell prior to the uplink data switching, at least one PDCP SDU of the uplink data is transmitted or retransmitted to an RLC layer associated with the target cell, in an ascending order of count values from a count value of the first PDCP SDU, and
wherein in case that the bearer is an unacknowledged mode (UM) DRB, and all PDCP SDUs of the uplink data have been processed by the PDCP layer and have not yet been submitted to a lower layer, the all PDCP SDUs of the uplink data are transmitted to the RLC layer associated with the target cell.

2. The method of claim 1, further comprising:
performing, by the PDCP layer, header compression on the PDCP SDU;
performing, by the PDCP layer, integrity protection and ciphering on the PDCP SDU; and
transmitting, from the PDCP layer to the RLC layer associated with the target cell, a resulting PDCP data PDU.

3. The method of claim 1, wherein the uplink data is transmitted to the target cell in case a resource for transmitting the uplink data to the target cell and a resource for transmitting the uplink data to the source cell overlap.

4. A user equipment (UE), comprising:
a transceiver; and
a processor coupled with the transceiver and configured to:
control the transceiver to receive, from a source cell, a radio resource control (RRC) reconfiguration message indicating a handover,
configure a medium access control (MAC) layer for a target cell based on the RRC reconfiguration message, wherein the RRC reconfiguration message includes information indicating a bearer is configured as a dual active protocol stack (DAPS) bearer,
control, the MAC layer for the target cell, to perform a random access procedure on the target cell for a DAPS handover,
indicate, from the MAC layer for the target cell to an RRC layer, an indication of completion of the random access procedure based on completing the random access procedure on the target cell,
control, a packet data convergence protocol (PDCP) layer, to switch uplink data for the bearer configured as the DAPS bearer based on receiving, from the RRC layer, a request for uplink data switching, and
transmit, to the target cell, the uplink data,
wherein in case that the bearer is an acknowledged mode (AM) data radio bearer (DRB), and a first PDCP service data unit (SDU) of the uplink data is not confirmed a successful delivery by a radio link controller (RLC) layer associated with the source cell prior to the uplink data switching, at least one PDCP SDU of the uplink data is transmitted or retransmitted to an RLC layer associated with the target cell, in an ascending order of count values from a count value of the first PDCP SDU, and
wherein in case that the bearer is an unacknowledged mode (UM) DRB, and all PDCP SDUs of the uplink data have been processed by the PDCP layer and have not yet been submitted to a lower layer, the all PDCP SDUs of the uplink data are transmitted to the RLC layer associated with the target cell.

5. The UE of claim 4, wherein the processor is further configured to:
control the PDCP layer to perform header compression on the PDCP SDU,
control the PDCP layer to perform integrity protection and ciphering on the PDCP SDU by using the count values, and
control the PDCP layer to transmit, to the RLC layer associated with the target cell, a resulting PDCP data PDU.

6. The UE of claim 4, wherein the uplink data is transmitted to the target cell in case a resource for transmitting the uplink data to the target cell and a resource for transmitting the uplink data to the source cell overlap.

* * * * *